(12) United States Patent
Wang et al.

(10) Patent No.: US 8,857,980 B2
(45) Date of Patent: Oct. 14, 2014

(54) AUTOMATICALLY STRETCHABLE FOLDING SPECTACLES

(75) Inventors: Suyuan Wang, Shenzhen (CN); Huajie Wang, Shenzhen (CN)

(73) Assignee: Suyuan Wang, Shenzhen, Guangdong (CN)

( * ) Notice: Subject to any disclaimer, the term of this patent is extended or adjusted under 35 U.S.C. 154(b) by 323 days.

(21) Appl. No.: 13/505,264

(22) PCT Filed: Apr. 22, 2010

(86) PCT No.: PCT/CN2010/072043
§ 371 (c)(1),
(2), (4) Date: Apr. 30, 2012

(87) PCT Pub. No.: WO2011/054197
PCT Pub. Date: May 12, 2011

(65) Prior Publication Data
US 2012/0224136 A1  Sep. 6, 2012

(30) Foreign Application Priority Data
Nov. 9, 2009  (WO) ................ PCT/CN2009/074861

(51) Int. Cl.
*G02C 5/08* (2006.01)
*G02C 5/06* (2006.01)

(52) U.S. Cl.
CPC ... *G02C 5/08* (2013.01); *G02C 5/06* (2013.01)
USPC ......................................................... 351/63

(58) Field of Classification Search
CPC ............ G02C 5/006; G02C 5/02; G02C 5/06; G02C 5/08; G02C 2200/06; G02C 2200/26
USPC ........................................................... 351/63
See application file for complete search history.

(56) References Cited

U.S. PATENT DOCUMENTS 5,208,616 A *  5/1993  Chang ............................. 351/63
6,540,349 B1 *  4/2003  Liesegang ....................... 351/63

FOREIGN PATENT DOCUMENTS

| CN | 97111929.5 | 3/1999 |
| CN | 200810217846.5 | 4/2009 |
| CN | 200910133429.7 | 9/2009 |

\* cited by examiner

*Primary Examiner* — Huy K Mai
(74) *Attorney, Agent, or Firm* — CBM Patent Consulting, LLC

(57) ABSTRACT

Automatically stretchable folding spectacles, comprising: a first rim, with a first lens being provided within the first rim; a second rim, with a second lens being provided within the second rim; a first leg; and a second leg, wherein the first rim and the first leg are elastically connected via a first elastic member; the second rim and second leg are elastically connected via a second elastic member; a middle beam mechanism is provided between the first rim and second rim; and a locking mechanism is provided between the first leg and the second leg, which makes the spectacles capable of keeping a folded state after the spectacles are completely folded. The wearer needs only to press the locking mechanism with one hand, and the whole spectacles will stretch naturally and exhibit an available state under the action of the tension of the elastic members.

19 Claims, 16 Drawing Sheets

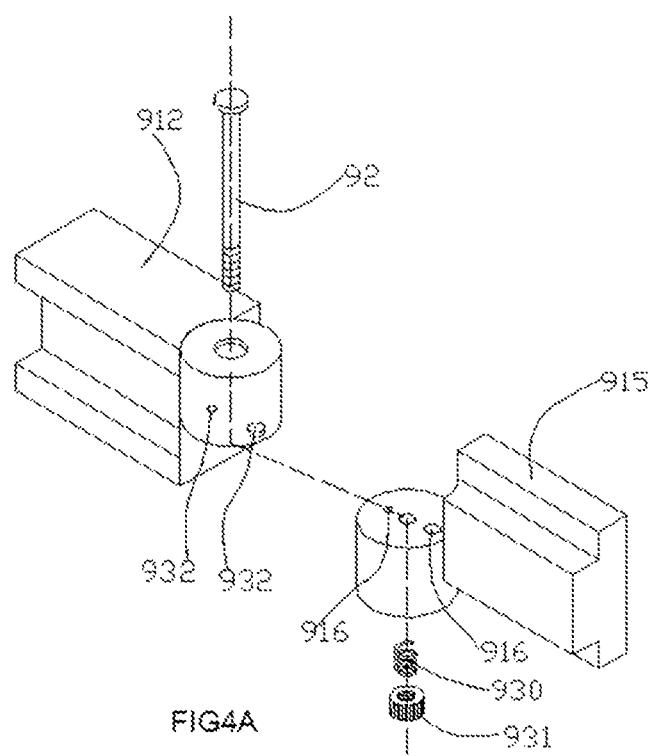

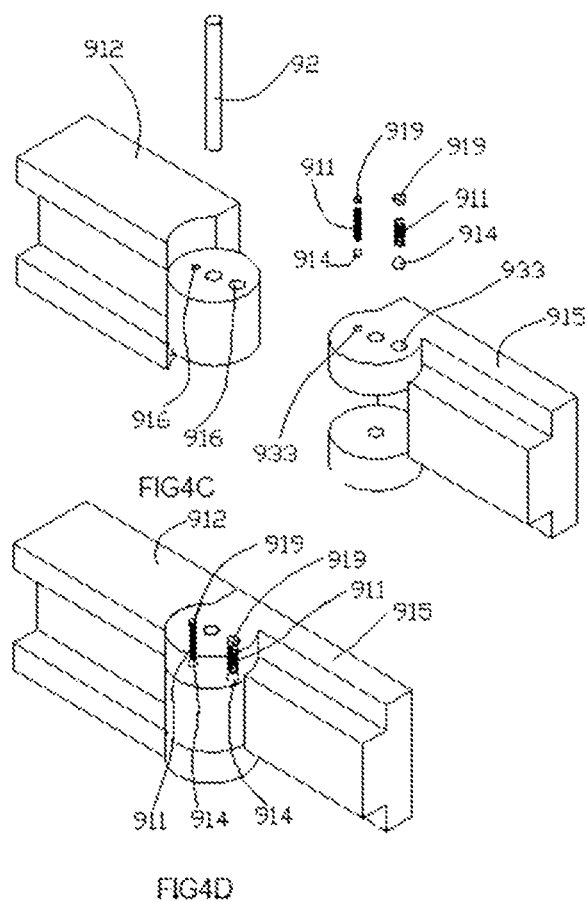

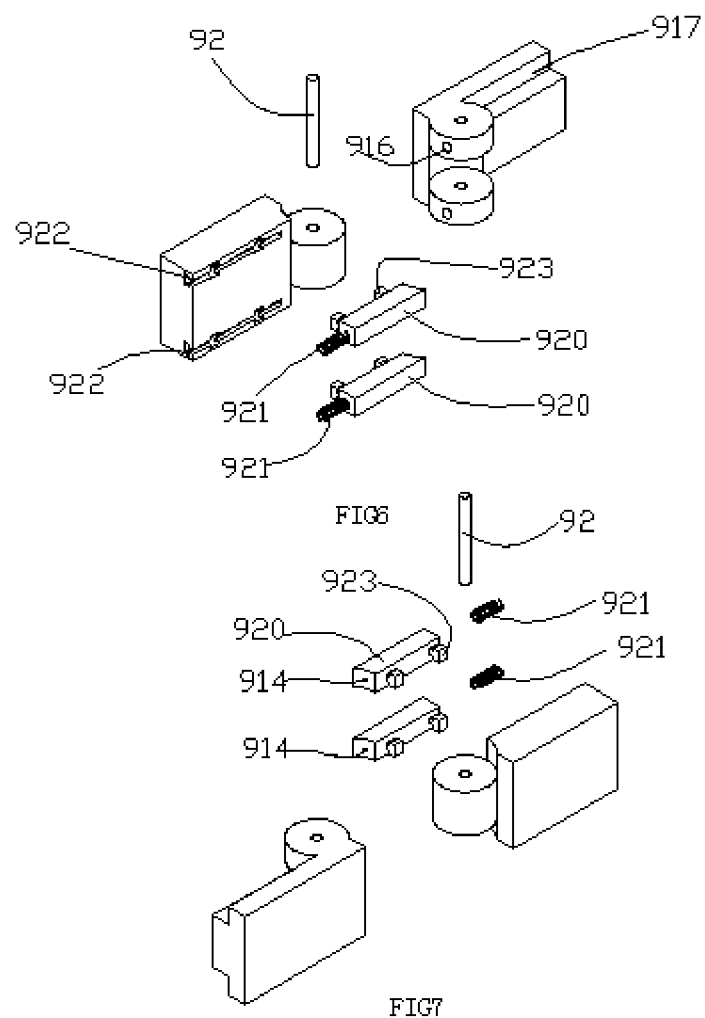

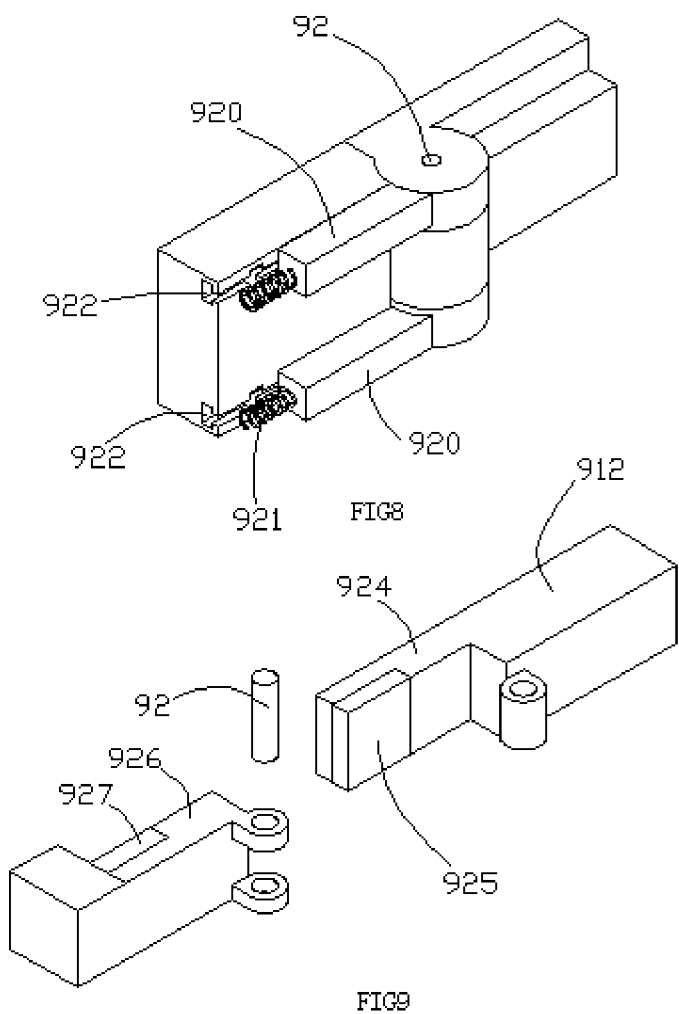

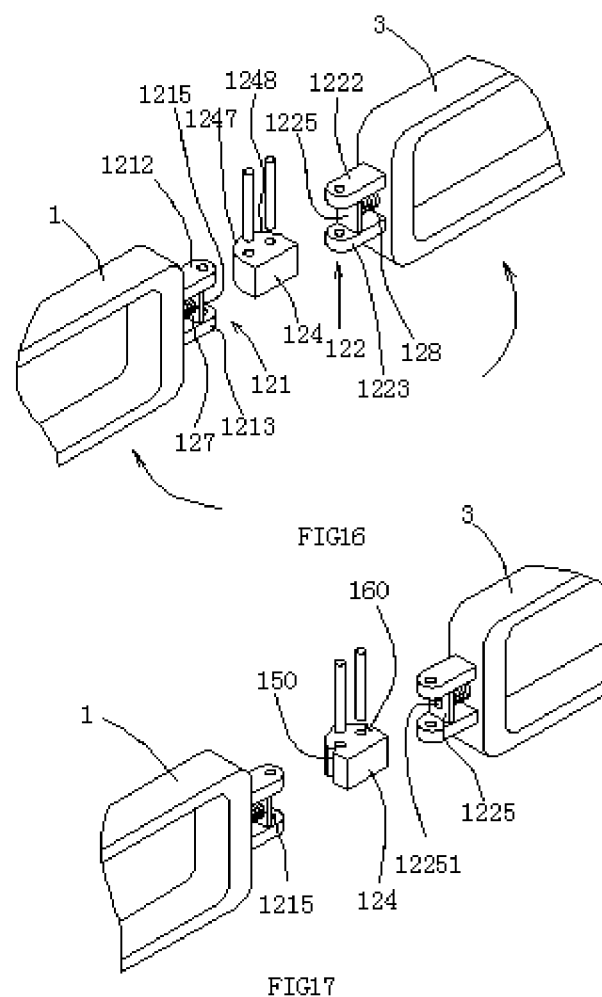

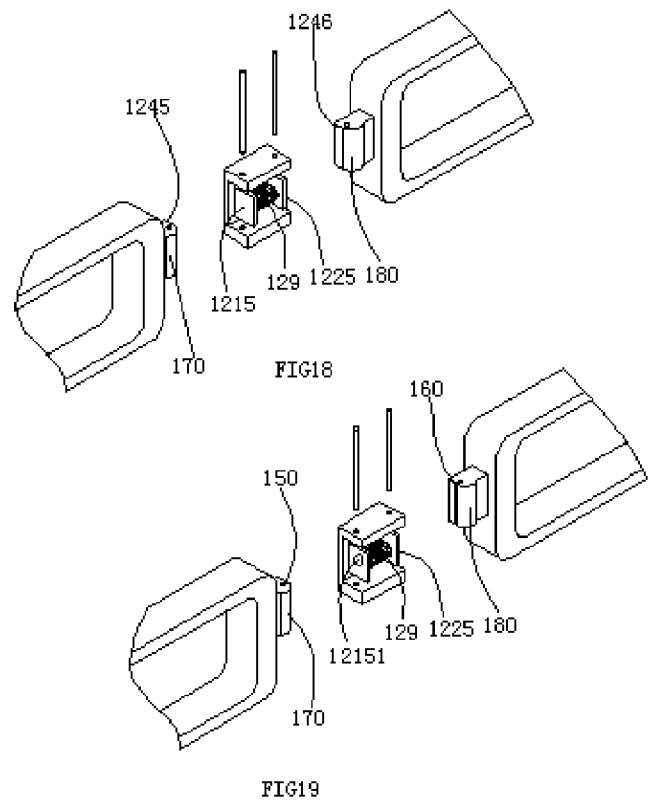
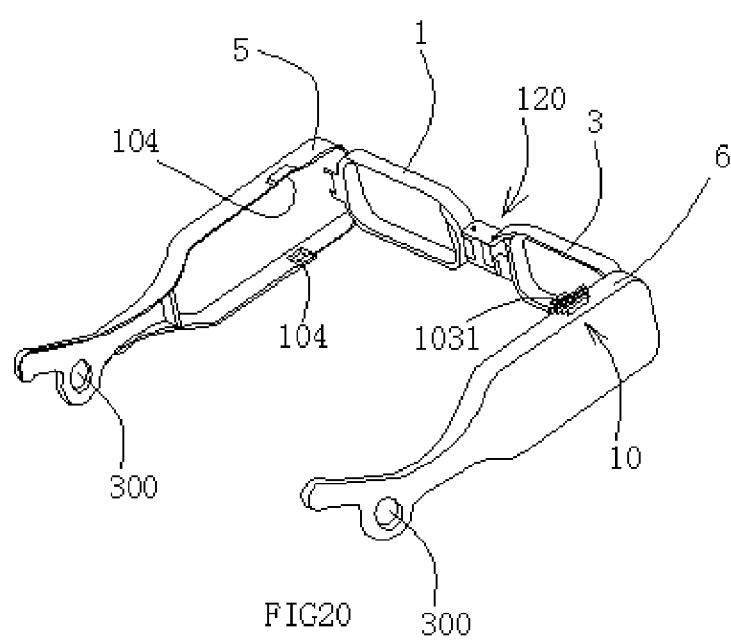

AUTOMATICALLY STRETCHABLE FOLDING SPECTACLES

TECHNICAL FIELD

The present invention relates to folding spectacles and, in particular, automatically stretchable folding spectacles that can be unfolded with only one hand.

BACKGROUND ART

In some cases, such as driving or going to a bank or an airport for business, only one of hands is available for a wearer, and in such case, the spectacles can not be unfolded in convenience. In order to solve this problem, the inventor previously proposed two Chinese patent documents CN200810217846.5 and CN200910133429.7, titled "Automatically stretchable folding spectacles", which connect a leg to a rim and a rim to a rim via three elastic members respectively, achieving that the stretchable folding spectacles can be completely unfolded with only one hand. However, in practice, both rims of the spectacles can not be stretched into a line, and in most cases only be stretched into a M-shaped profile, consequently, such spectacles are not convenient for use.

SUMMARY OF THE INVENTION

In order to overcome the above-described shortcomings, an object of the present invention is to provide automatically stretchable folding spectacles which can be unfolded conveniently with one hand and align both rims of the spectacles.

Another object of the present invention is that no additional spectacles case is needed.

The present invention can be achieved by the following technical solutions: automatically stretchable folding spectacles are designed, which comprise: a first rim, with a first lens being provided within the first rim; a second rim, with a second lens being provided within the second rim, a first leg and a second leg, characterized in that the width of the end of the first leg connected to the first rim is larger than or equal to the width of the first lens, with its shape being matched with the shape of the first lens; and the width of the end of the second leg connected to the second rim is larger than or equal to the width of the second lens, with its shape being matched with the shape of the second lens; the first rim and first leg are elastically connected via a first elastic member; the second rim and second leg are elastically connected via a second elastic member; and the spectacles further comprising: a middle beam mechanism, the middle beam mechanism being located between the first rim and the second rim, acting as an elastic bridge.

The middle beam mechanism of the present invention can have the following several kinds of structure:

The first kind is: the middle beam mechanism comprises a first middle beam connection member, a second middle beam connection member, a first extension spring, a second extension spring, and a middle member, charaterized in that the first middle beam connection member and the second middle beam connection member are fixed to the inner side of the first and the second rims respectively, and have a free end of the first middle end connection member and a free end of the second middle end connection member respectively, the end surfaces of the free ends are planes; a first translot is provided on the first middle beam connection member, and a second translot is provided on the second middle beam connection member, with the first extension spring being disposed inside the first translot, the inner end of the first extension spring and the first middle beam connection member being fixedly connected, and the second extension spring being disposed inside the second translot, the inner end of the second extension spring and the second middle beam connection member are fixedly connected; the middle member is located between the first middle beam connection member and the second middle beam connection member; a first pivoting connected hole and a second pivoting connected hole are provided at the both sides of the middle member, which are perpendicular to the normal of the rim, with a first pivoting connected pin being provided within the first pivoting connected hole, the outer end of the first extension spring being nested around the first pivoting connected pin, and a second pivoting connected pin being provided within the second pivoting connected hole, the outer end of the second extension spring being nested around the second pivoting connected pin; the upper and lower surfaces of the middle member are flat, and front and rear surfaces of the middle member are cambered; the radius from the first or the second pivoting connected hole to the corresponding contour thereof is larger than the radius from the first or the second pivoting connected hole to the corresponding plane thereof; when the spectacles are completely stretched, the tip surface—of the free end of the first middle beam connection member and one side of the middle member exhibit a surface contact, and the first extension spring exhibits a contracted state; the tip surface of the free end of the second middle beam connection member and the other side of the middle member exhibit a surface contact, and the second extension spring exhibits a contracted state; when the spectacles are completely folded, the tip surface of the free end of the first middle beam connection member and the contour on one side of the middle member exhibit a line contact, and the first extension spring exhibits an extended state; the tip surface of the free end of the second middle beam connection member and the contour on other side of the middle member exhibit a line contact, and the second extension spring exhibits an extended state; and a locking mechanism is provided between the first leg and the second leg laterally and symmetrically, which makes the spectacles capable of keeping a folded state after the spectacles are completely folded.

In the first kind of the middle beam mechanism, a first slider can be added within the first translot, a first slider pivoting connected hole is provided on the outer end of the first slider, and a first transverse vias is provided on the first slider, with the first extension spring being nested around the first pivoting connected pin through the first transverse vias; a second slider is provided within the second translot, a second slider pivoting connected hole is disposed on the outer end of the second slider, and a second transverse vias is provided on the second slider, with the second extension spring being nested around the second pivoting connected pin through the second transverse vias.

With regard to the improvement of the first kind of the middle beam structure, a first nosepiece is provided on the inner side of the first middle beam connection member, which covers the first slider and the first extension spring inside the first nosepiece; and a second nosepiece is provided on the inner side of the second middle beam connection member, which covers the second slider and the second extension spring inside the second nosepiece.

The second kind is: the middle beam mechanism comprises a first middle beam connection member, a second middle beam connection member, a first contraction spring, a second contraction spring, and a middle member, charaterized in that the first middle beam connection member comprises a first upper connection piece and a first lower connection piece, which are fixed to the inner side of the first rim in parallel apart from each other, a pivoting connected hole of the first beam connection member is provided on the first upper connection piece and the first lower connection piece, a first contraction spring is disposed between the first upper connection piece and the first lower connection piece, and the inner end of the contraction spring is fixed to the first rim, and a first slider is provided on the outer end of the contraction spring, which can be slidable between the first upper connection piece and the first lower connection piece; the second middle beam connection member comprises a second upper connection piece and a second lower connection piece, which are fixed to the inside of the second rim in parallel apart from each other, a pivoting connected hole of the second beam connection member is provided on the second upper connection piece and the second lower connection piece, a second contraction spring is disposed between the second upper connection piece and the second lower connection piece, with the inner end of the contraction spring being fixed to the second rim, and a second slider is provided on the outer side of the contraction spring, which can be slidable between the second upper connection piece and the second lower connection piece; the middle member is located between the first middle beam connection member and the second middle beam connection member; a first pivoting connected hole and a second pivoting connected hole are provided at the both sides of the middle member, which are perpendicular to the normal of the rim, with a first pivoting connected pin being provided within the first pivoting connected hole for pivoting connecting the first middle beam connection member and the middle member and a second pivoting connected pin being provided within the second pivoting connected hole for pivoting connecting the second middle beam connection member and the middle member; the upper and lower surfaces of the middle member are flat, and the front and rear surfaces of the middle member are cambered; the radius of the first or the second pivoting connected hole extending to the corresponding contour thereof is larger than the radius of the first or the second pivoting connected hole extending to the corresponding plane; when the spectacles are completely stretched, the tip surface of the free end of the first middle beam connection member and one side of the middle member exhibit a surface contact, and the first extension spring exhibits an extended state; the tip surface of the free end of the second middle beam connection member and the other side of the middle member exhibit a surface contact, and the second extension spring exhibits an extended state; when the spectacles are completely folded, the tip surface of the free end of the first middle beam connection member and the contour on one side of the middle member exhibit a line contact, and the first extension spring exhibits an extended state; the tip surface of the free end of the second middle beam connection member and the contour on the other side of the middle member exhibit a line contact, and the second extension spring exhibits an extended state; and two locking mechanisms are provided between the first leg and the second leg laterally and symmetrically, which makes the spectacles capable of keeping a folded state after the spectacles are completely folded.

In the second kind of the middle beam mechanism, a first segment is provided on one side of the first slider near the middle member, and a first concave is provided in the position of the middle member corresponding to the first segment; a second segment is provided on one side of the second slider near the middle member, and a second concave is provided in the position of the middle member corresponding to the second segment; when the spectacles are completely unfolded, the first segment leans within the first concave, and the second segment leans within the second concave.

The third kind is: the middle beam mechanism comprises a first middle beam connection member, a second middle beam connection member, a transverse contraction spring, and a middle member, charaterized in that the first middle beam connection member and the second middle beam connection member are fixed to the inside of the first rim and the second rim respectively, and have a free end of the first middle beam connection member and a free end of the second middle beam connection member respectively; the top end surfaces of the free ends are flat, and sides adjacent to the top end surfaces are contours; a first pivoting connected hole is provided on the free end of the first middle beam connection member, which is perpendicular to the normal of the rim, and the radius of the first pivoting connected hole of the first middle beam connection member extending to the corresponding contour thereof is larger than the first pivoting connected hole of the first middle beam connection member extending to the corresponding plane thereof; a second pivoting connected hole is provided on the free end of the second middle beam connection member, which is perpendicular to the normal of the rim, and the radius of the second pivoting connected hole of the second middle beam connection member extending to the corresponding contour thereof is larger than the second pivoting connected hole of the second middle beam connection member extending to the corresponding plane thereof; the middle member is located between the first middle beam connection member and the second middle beam connection member; a first translot is provided on the middle member, and a transverse contraction spring is provided on the translot, and a first slider and a second slider is provided at the both sides of the transverse contraction spring, a first pivoting connected hole and a second pivoting connected hole are provided at the both sides of the middle member, which are perpendicular to the normal of the rim, with a first pivoting connected pin being provided within the first pivoting connected hole for pivoting connecting the middle member and the first middle beam connection member and a second pivoting connected pin being provided within the second pivoting connected hole for pivoting connecting the middle member and the second middle beam connection member; when the spectacles are completely stretched, the plane of the free end of the first middle beam connection member and the first slider exhibit a surface contact, the plane of the free end of the second middle beam connection member and the second slider exhibit a surface contact, and the transverse contraction spring exhibits an extended state; when the spectacles are completely folded, the contour of the free end of the first middle beam connection member and the first slider exhibit a line contact, the contour of the free end of the second middle beam connection member and the second slider exhibit a line contact, and the transverse contraction spring exhibits a contracted state; and two locking mechanisms are provided between the first leg and the second leg laterally and symmetrically, which makes the spectacles capable of keeping a folded state after the spectacles are completely folded.

Likewise, in the third kind of the middle beam mechanism, a first segment is provided outside the first slider, and a first concave is provided in the position of the first middle beam connection member corresponding to the first segment; a second segment is provided outside the second slider, and a second concave is provided in the position of the second middle beam connection member corresponding to the second segment; when the spectacles are completely unfolded, the first segment leans within the first concave, and the second segment leans within the second concave.

All of the spectacles with the three different middle beam mechanisms described above can use the locking mechanism described below, which is buckles extending inward on the upper and lower sides of the first leg respectively; hook holes are provided in the position of the buckles on the second leg corresponding to the first leg; when the spectacles are folded, the buckles are properly hooked inside the hook hole, and elastic press pieces are provided outside the hook holes respectively, bumps are provided on the elastic press pieces corresponding to the hook holes, and when the elastic press pieces are pressed inward the hook holes, the buckles are squeezed by the bumps, separating the buckles from the hook holes; or the structure of the locking mechanism is buckles extending inward on the upper and lower sides of the second leg respectively; hook holes are provided in the position of the buckles on the first leg corresponding to to the second leg; when the spectacles are folded, the buckles are properly hooked inside the hook holes, and elastic press pieces are provided outside the hook holes respectively, and bumps are provided on the elastic press pieces corresponding to the hook holes, and when the elastic press pieces are pressed inward the hook holes, the buckles are squeezed by the bumps, separating the buckles from the hook holes.

The present invention further discloses another automatically stretchable folding spectacles, comprising: a first rim, with a first lens being provided within the first rim, a second rim, with a second lens being provided within the second rim; a first leg, and a second leg, characterized in that the width of the end of the first leg connected to the first rim is larger than or equal to the width of the first lens, with its shape being matched with the shape of the first lens; and the width of the end of the second leg connected to the second rim is larger than or equal to the width of the second lens, with its shape being matched with the shape of the second lens; the first rim and the first leg are elastically connected via a first elastic member; the second rim and second leg are elastically connected via a second elastic member; characterized in that the first rim and the second rim are hinged, and a locking mechanism is provided on the hinge, which is used to keep the first rim and the second rim exhibiting linear; and a locking mechanism is provided between the first leg and the second leg laterally and symmetrically, which makes the spectacles capable of keeping a folded state after the spectacles are completely folded.

The structure of the locking mechanism is a spring of the locking mechanism being disposed within the accommodating hole on the side of the connected part of the hinge, a ball is provided outside the spring, a concave is provided on the other side of the connected part of the hinge corresponding to the position of the ball, and when the first rim and the second rim exhibit linear, the ball leans within the concave under the action of the spring, achieving the locating of the first rim and the second rim.

The spring and the ball are disposed on a connected part connected to the first rim, and the concave is disposed on a connected part connected to the second rim.

The spring and the ball are disposed on a connected part connected to the second rim, and the concave is disposed on a connected part connected to the first rim.

The structure of the locking mechanism is an extended plane extending from a connected part of the hinge located on one side of the nosepiece to another connected part, a first magnetic piece or a first metal piece is provided on the extended plane, and a second magnetic piece opposite to the first magnetic piece is provided on a plane of the another connected part corresponding to the extended plane, and when the first rim and the second rim exhibit linear, the second magnetic piece and the first magnetic piece or the first metal piece are connected and attracted, achieving the locating of the first rim and the second rim.

An inward concave first lens protective rim for storing the first lens is provided on the inner wall of the first leg; and also, an inward concave second lens protective rim for storing the second lens is provided on the inner wall of the second leg.

The parts of the Legs corresponding to the first lens protective rim and the second lens protective rim are made of a transparent or semitransparent material.

Nosepieces of the folding spectacles are disposed at the central part of the inner sides of the rims, and elastically connected to the rims.

The first elastic member comprises a first rotational shaft and a first spring, with the first spring being nested around the first rotational shaft, and both ends of the first spring leaning against the inner wall of the first rim and the first leg; the second elastic member comprises a second rotational shaft and a second spring, with the second spring being nested around the second rotational shaft, and both ends of the second spring leaning against the inner wall of the second rim and the second leg.

Since elastic members are used between the rims, a middle beam mechanism or a locking mechanism is used between the rims, and a locking mechanism is provided between the first leg and the second leg that makes the spectacles capable of keeping a folded state after the spectacles are completely folded, the present invention has the advantage that the wearer needs only to press the locking mechanism with one hand, and the whole spectacles will stretch naturally and exhibit an available state under the action of the tension of the elastic members, eliminating the trouble in a conventional process that when the spectacles are to be used, they must be taken out from the case first and then unfolded with both hands, and facilitating the convenient and quick use of the present invention. Furthermore, the present invention has the advantage that an additional case is not needed.

BRIEF DESCRIPTION OF THE DRAWINGS

FIG. 4A is an enlarged and exploded schematic diagram of one locking mechanism of FIG. 1.

FIG. 4C is an enlarged and exploded schematic diagram of another locking mechanism of FIG. 1.

FIG. 4D is a sectional view of FIG. 4C after being assembled.

FIG. 6 is an enlarged and exploded schematic diagram of still further locking mechanism of the present invention.

FIG. 7 is a schematic diagram of FIG. 6 viewed from another angle.

FIG. 8 is a schematic diagram of FIG. 6 after being assembled.

FIG. 9 is an enlarged and exploded schematic diagram of another locking mechanism of the present invention.

FIGS. 16 to 19 are several deformed schematic diagrams of the middle beam mechanism of the present invention.

FIG. 20 is a third embodiment of the present invention after stretching.

DETAILED DESCRIPTION OF THE INVENTION

Figure 1:
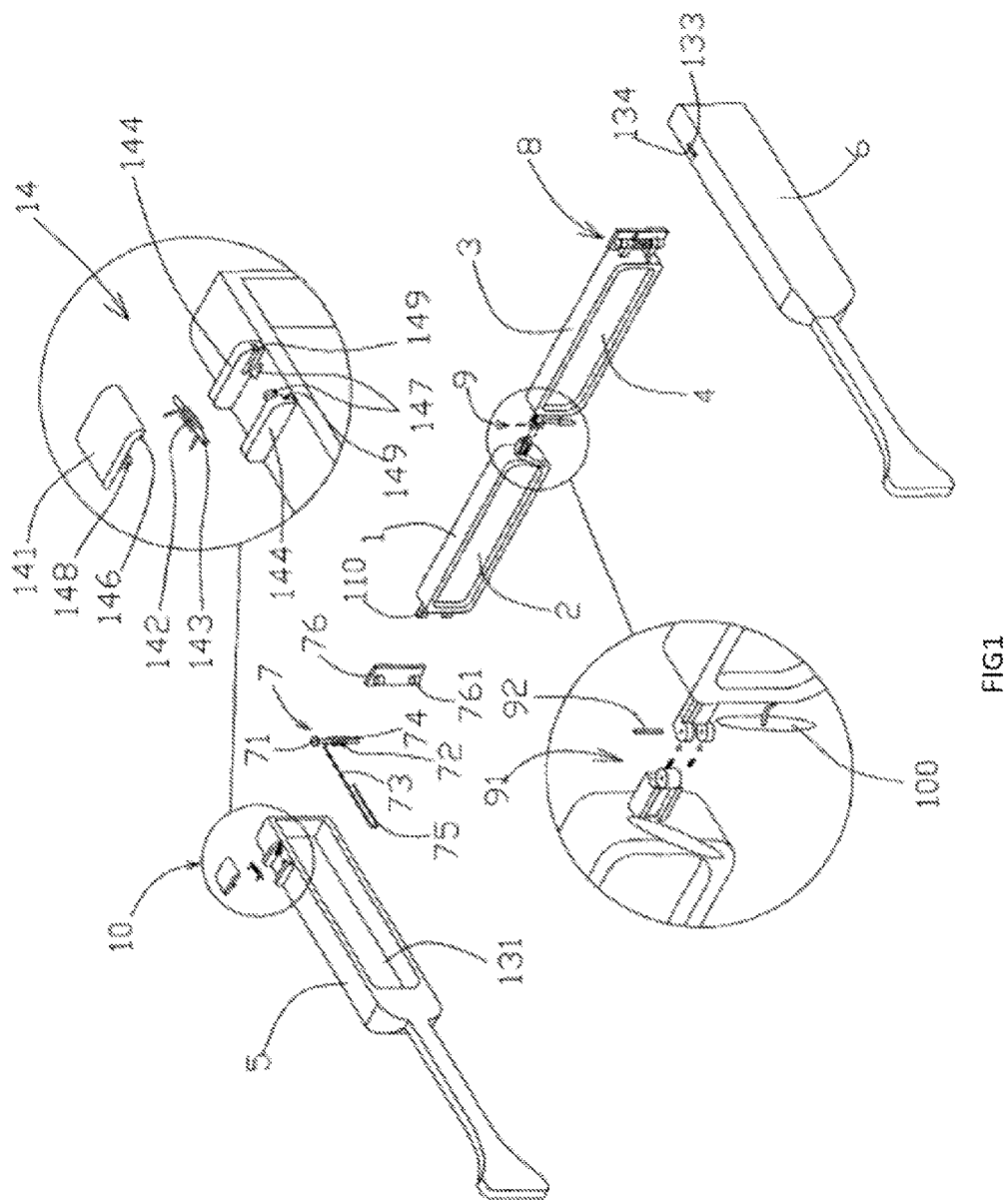
FIG. 1 is a schematic diagram of an embodiment of the present invention after stretching.
Figure 2:
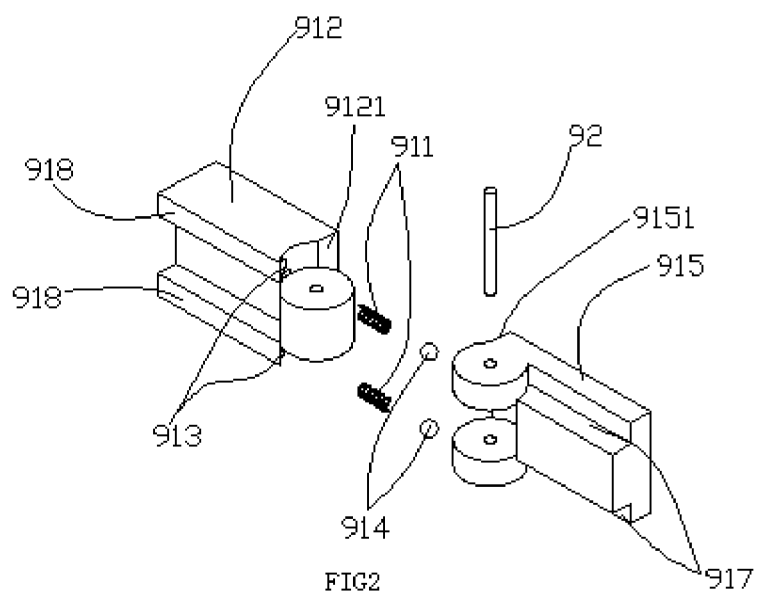
FIG. 2 is an enlarged and exploded schematic diagram of another location of FIG. 1.
Figure 3:
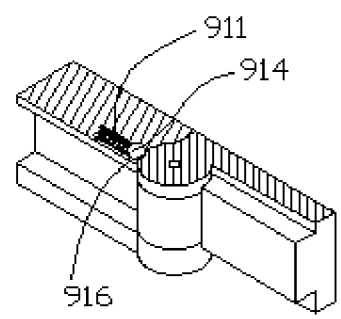
FIG. 3 is a local sectional view of FIG. 2.

Referring to FIGS. 1, 2 and 3, automatically stretchable folding spectacles are disclosed, and in the present embodiment, legs and rims are made of plastics, with the first lens and the second lens being glass lenses, and also being highly transparent resin lenses. The spectacles comprise a first rim 1, a second rim 3, a first leg 5, and a second leg 6; a first lens 2 is provided within the first rim 1, a second lens 4 is provided within the second rim 3, and the width of the end of the first leg 5 connected to the first rim 1 is larger than or equal to the width of the first lens 2, with its shape being matched with the shape of the first lens 1, so as to meet the requirement that the first lens 1 is protected after the spectacles are completely folded; the width of the end of the second leg 6 connected to the second rim 3 is larger than or equal to the width of the second lens 4, with its shape being matched with the shape of the second lens 4, so as to meet the requirement that the second lens 4 is protected after the spectacles are completely folded; a first elastic member 7 is provided between the first rim 1 and the first leg 5, and the first rim 1 is elastically connected to the first leg 5 via the first elastic member 7; a second elastic member 8 is provided between the second rim 3 and the second leg 6, and the second rim 3 is elastically connected to the second leg 6 via the second elastic member 8; a hinge 9 is provided between the first rim 1 and the second rim 3, and the first rim 1 is elastically connected to the second rim 3 via the hinge 9; the hinge 9 is connected via a hinged shaft 92, and a locking mechanism 91 is provided on the hinge 9, which is used to keep the first rim 1 and the second rim 3 exhibiting linear, the structure of the locking mechanism 91 is that a spring 911 of the locking mechanism 91 is disposed within an accommodating hole 913 of a connected part 912 of the hinge 9 connected to the first rim 1 (referring to FIGS. 2 and 3), a steel ball 914 is provided outside the spring 911 (the steel ball here is just an example, in practice the steel ball can be replaced with a copper ball, a ball which is made of a hard metal, or even a glass ball, likewise hereinafter), a concave 916 is provided on the connected part 915 of the hinge 9 connected to the second rim 3 corresponding to the position of the steel ball 914 (the concave can not be seen in FIG. 2, and the concave 916 here is spherical crown shaped), and when the first rim 1 and the second rim 3 exhibit linear, the steel ball 914 leans within the concave 916 under the action of the spring 911, achieving the locating of the first rim 1 and the second rim 3 and keeping them exhibiting linear; in addition to the function of locating, the locking mechanism 91 composed of the spring 913, the steel ball 914 and the concave 916 (two set of locating members of the spring are used in this embodiment, in practice, only one set of the locating member of the spring can be used, likewise hereinafter) has the function of buffering the unfolding speed of the spectacles in the process of the unfolding. because when the spectacles are folded, the steel ball 914 leans against the outer wall of the connected part 915 of the second rim 3 under the action of the spring 913, and when the spectacles are unfolded, there is a certain friction between the steel ball 914 and the second rim 3, playing a role in buffering the unfolding speed of the spectacles. When the spectacles are completely folded, the raised line 918 on the connected part 912 connected to the first rim 1 right resides within the groove 917 on the connected part 915 connected to the second rim 3, so as to ensure that the spectacles are completely folded. a plane 9121 is provided inside the connected part 912 connected to the first rim 1, and a plane 9151 is provided inside the connected part 915 connected to the second rim 3, when the spectacles are completely unfolded, the flat 9121 and 9151 are just withstood, so as to protect the rims from exceeding 180 degree. In this embodiment, a locking mechanism 10 is provided between the first leg 5 and the second leg 6, which makes the spectacles capable of keeping a folded state after the spectacles are completely folded. On the outer side of the first leg 5 there is provided a pen-like hook, the function of which is to hang the spectacles to a pocket of the garment as a pen after the spectacles are completely folded, a pen-shaped slot for the insertion of a pen is reserved in the second leg 6, and a small pen, such as a ball-pen may be embedded within the pen-shaped slot, facilitating the use by users. Half rims can be used as the rims of the present invention.

In this embodiment, the locking mechanism 10 comprises a hook block 133 and a elastic clip 14, a plane of the hook block 133 corresponding to the elastic clip 14 is a contour 134, the elastic clip 14 comprises a clipping piece 141, and a hook 146 is provided at the front end of the clipping piece 141. when the spectacles are folded, the hook 146 hooks the hook block 133 under the action of the spring 142, a plane of the hook block 146 corresponding to the hook 133 is also a contour, and the plane of the hook block 133 corresponding to the elastic clip 14 is a contour 134 and the plane of the hook block 146 corresponding to the hook 133 is also a contour, because such design can reduce a friction between the contours of the hook 146 and the hook block 133, facilitating the interlocking there between. downward lugs 148 are provided at the both sides of the clipping piece 141 respectively, and two locating pins 144 reside on the outer sides of the downward lugs 148 respectively, the spring 142 is nested at the central part of the rotational shaft 143, and after passing through the downward lugs 148, the rotational shaft 143 sticks in the locating pins 144, connecting the clipping piece 141 and the first leg 5 together. on the first leg 5, a supporting member 147 is provided between the both locating pins 144 for supporting the front of the clipping piece 141, card slots 149 having a inward opening are provided on the inner wall corresponding to the two locating pins 144 respectively, the height of the supporting member 147 is higher than the bottom of the card slots 149, after the rotational shaft 143 moves from the opening to the card slots 149, crosses the top end of the supporting member 147, and is sticked within the back end of the card slot at the back of the supporting member 147, the location of the clipping piece is achieved. The main function of the supporting member 147 is to avoid the clipping piece 141 being excessively downward under the action of the spring 142 and not properly hooking on the hook block hook 133 with the supporting member 147 leaning against the inner wall of the hook 146.

In this embodiment, a first lens protective rim 131 which is concave inward is provided on the inner wall of the first leg for preserving the first lens; likewise, a second lens protective rim which is concave inward is provided on the inner wall of the second leg for preserving the second lens (not shown), the upper and lower lenses on the first lens and the second lens being completely packed by the protective rims so as to protect the lenses from being worn off after the spectacles are completely folded can be achieved by such design.

A nosepiece 100 of the folded spectacles in the present invention is disposed at the central part of the inner side of the rim, and is elastically connected to the rim. The nosepiece of the spectacles being disposed at the central part of the inner side of the rim is because this structure can enable the folded spectacles to be usable at the both sides. That is to say, the folded spectacles can be taken down and worn randomly, regardless of the right and left sides of the lenses and the legs. The elastic connection between the nosepiece 100 and the rim is convenient for the nosepiece 100 being contracted when the spectacles are folded, thus reducing the thickness of the folded spectacles.

In this embodiment, the parts of the legs corresponding respectively to the first lens protective rim and the second lens protective rim are made of a transparent or semitransparent material.

In the present invention, the structures of the first elastic member 7 and the second elastic member 8 employed are identical, both of which comprise a rotational shaft and a spring, with the spring being nested around the rotational shaft. the first elastic element 7 comprises a first rotational shaft 71, (in practice, the rotational shaft may be a screw, with the same structure as the screw used in existing spectacles) and a first spring 72, with the first spring 72 being nested around the first rotational shaft 71, and both ends 73, 74 of the first spring 72 leaning against the inner walls of the first rim 1 and the first leg 5, respectively; the end 74 of the first spring 72 leaning against the first leg 5 can inward extend towards the first lens protective rim 131, forming a cloth-hanging end 75 for hanging a spectacles cloth, and a pre-folded spectacles cloth being able to be stored within the first lens protective rim 131 via the cloth-hanging end 75; when the spectacles cloth is needed to use, it can be conveniently taken from the lens protective rim 131; in this embodiment, the first elastic member 7 further comprises a mounting piece 76, two first lugs 761 are provided on the inner bottom of the mounting piece 76, and second lugs 110 corresponding to the first lugs 761 are provided on the first rim 1, with the first rotational shaft 71 being interposed into the first lugs 761 and the second lugs 110, connecting the mounting piece 76 and the first rim 1, and the first spring being located on the rotational shaft 71 between the two second lugs 110. Such a configuration facilitates the mounting between the first elastic member 7 and the first leg 5. That is to say, in assembling the spectacles, the first elastic member 7 is assembled first following the configuration, and then the mounting piece is adhesively or otherwise fixed to the inner wall of the lens protective rim 131 at the front end of the first leg.

The structures of the second elastic member 8 and the first elastic member 7 are identical, and the second elastic member 8 comprises a second rotational shaft and a second spring, with the second spring being nested around the second rotational shaft, and both ends of the second spring leaning against the inner walls of the second rim and the second leg, respectively.

Figure 4:
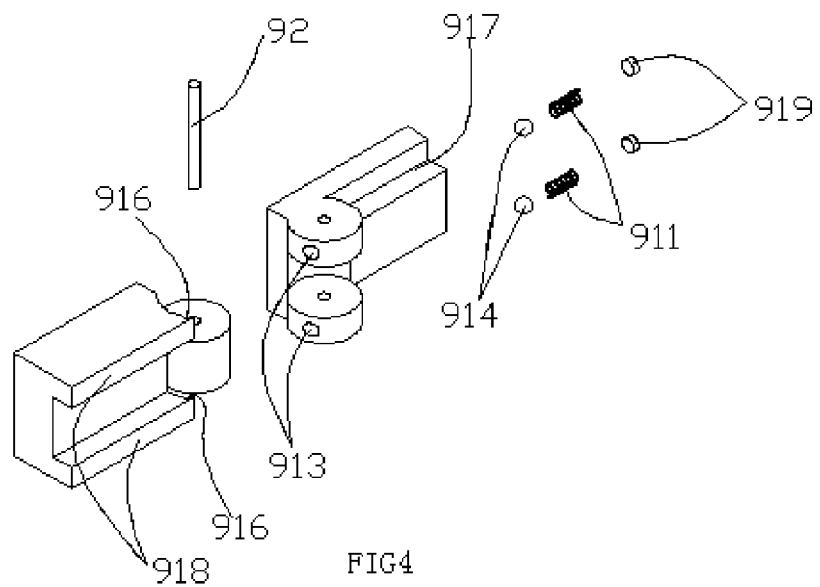
FIG. 4 is an enlarged and exploded schematic diagram of further locking mechanism of the present invention.
Figure 4B:
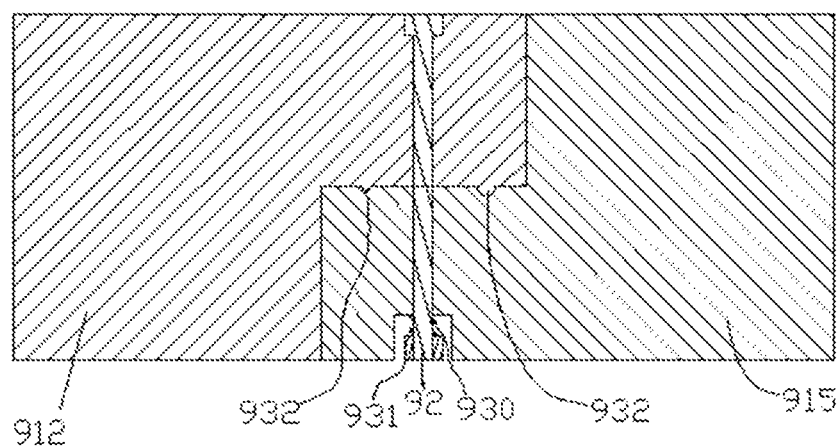
FIG. 4B is a schematic diagram of FIG. 4A after being assembled.

Referring to FIGS. 4A and 4B, FIG. 4A is an enlarged and exploded schematic diagram of one locking mechanism of FIG. 1. FIG. 4B is a schematic diagram of FIG. 4A after being assembled. the locking mechanism 91 described in the present invention can be designed to comprise a locating spring 930, with the locating spring 930 being nested against the hinged shaft 92 of the hinge 9, and as shown in this figure, the locating spring 930 is provided at the bottom of the hinged shaft, and is compressed tightly via a nut 931 which is in a screwed connection with the hinged shaft 92, at this time, a connected part 912 on one side of the hinged shaft 9 can be compressed tightly against a connected part 915 on the other side of the hinged shaft 9 by the locating spring 930, two pair of hump 932 and concave 916 are provided on the bottom surface where the connected part 912 on one side of the hinge 9 and the connected part 915 on the other side of the hinge 9 are contacted (in the present invention, one hump 932 and one concave 916 are referred as a pair of hump 932 and concave 916), wherein, the dimension of one pair of hump 932 and concave 916 is not equal to that of the other pair of hump 932 and concave 916, that is to say, the contour dimension of one pair of hump 932 and concave 916 is larger than or smaller than that of the other pair of hump 932 and concave 916, in this way, when the spectacles are completely unfolded, the hump 932 corresponding to the dimension is just sticked within the concave 916, keeping the first rim 1 and the second rim 3 being linear; while when the spectacles are to be gathered up or folded, the hump 932 rotates a certain angle corresponding to the concave 916, and because the contour dimensions of both humps 932 are different, the big hump 932 can not fall into the small concave 916, and although the small hump 932 can fall into the big concave 916, a locking function can not be achieved by the both in this condition, due to the difference dimension there between. In the present embodiment, the principle of the present invention is explained based on two pairs of hump 932 and concave 916, however, this embodiment can not be used for limiting the present invention, in practice, the structure of the hump 932 and the concave 916 in the present invention can be set to be greater than two pairs. Provided that the contour dimension of at least one pair of hump 932 and concave 916 is not equal to that of other pairs of hump 932 and concave 916, the purpose of the present invention can be achieved. In order to ensure that the bottom surface where the connected part 912 on one side of the hinge 9 and the connected part 915 on the other side of the hinge 9 are contacted will not result in a slope between both bottom surfaces due to the difference of contour dimensions between two pairs of hump 932 and concave 916 after the two pairs of hump 932 and concave 916 are stuck with each other. a cylinder can be provided at the back end of the contour of the small hump 932 to ensure the conformability of the height between both humps 932 (Of course, when there are more than two humps, the smaller hump therein can be designed with a structure that a cylinder is provided at the back end of the contour of the small hump 932, adjusting the height of the small hump 932). In addition, in this embodiment, only one locating spring 930 is used, which is provided at the lower end of the hinged shaft 92, in practice, when one locating spring 930 is used, the locating spring 930 can be provided at the upper end of the hinged shaft 92; or a locating spring 930 each is provided at the upper and lower ends of the hinged shaft. The same function can also be achieved. The nut 931 in this embodiment can be disposed dependently, and can be integrated with the upper or lower bottom of the connected part 915 of the rim. In this embodiment, even if there is a certain error of the height between the big hump and the small hump, the normal use will not be influenced due to the existence of the locating spring 930.

Referring to FIGS. 4C and 4D, FIG. 4C is an enlarged and exploded schematic diagram of another locking mechanism of FIG. 1. FIG. 4D is a schematic diagram of FIG. 4C after being assembled. the general structures of the locking mechanism 91 illustrated in FIGS. 4C and 4D are the same as that illustrated in FIGS. 4A and 4B, and the difference is that the spring 911 of the locking mechanism 91 is disposed within the longitudinally accommodating hole 913 of the connected part 915 of the hinge 9 connected to the second rim 3, a steel ball 914 is provided at the lower end of the spring 911 (the steel ball here is just an example, in practice the steel ball can be replaced with a copper ball, a ball which is made of a hard metal, or even a glass ball, likewise hereinafter), a concave 916 is provided on the connected part 912 of the hinge 9 connected to the first rim 1 corresponding to the position of the steel ball 914, The upper end of the spring 911 is sealed by the screw plug 919, and when the first rim 1 and the second rim 3 exhibit linear, the steel ball 914 leans within the concave 916 under the action of the spring 911, achieving the locating of the first rim 1 and the second rim 3 and keeping them exhibiting linear; In this embodiment, there are two pairs of spring 911, steel ball 914, and concave 916, the dimension of one pair of spring 911, steel ball 914, and concave 916 therein is not equal to that of the other pair of spring 911, steel ball 914, and concave 916, that is to say, the contour dimension of one pair of hump 932 and concave 916 is larger than or smaller than that of the other pair of hump 932 and concave 916, when the spectacles are completely unfolded, the steel ball 914 corresponding to the dimension is just stuck within the concave 916, keeping the first rim 1 and the second rim 3 being linear; while when the spectacles are to be gathered up or folded, the steel ball 914 rotates a certain angle corresponding to the concave 916, and because the dimensions of both steel balls 914 are different, the big steel ball 914 can not fall into the small concave 916, and the function of locking can not be achieved. In this embodiment, even if there is a certain error of height between the big hump and the small hump, the normal use will not be influenced due to the existence of the locating spring 930.

Figure 5:
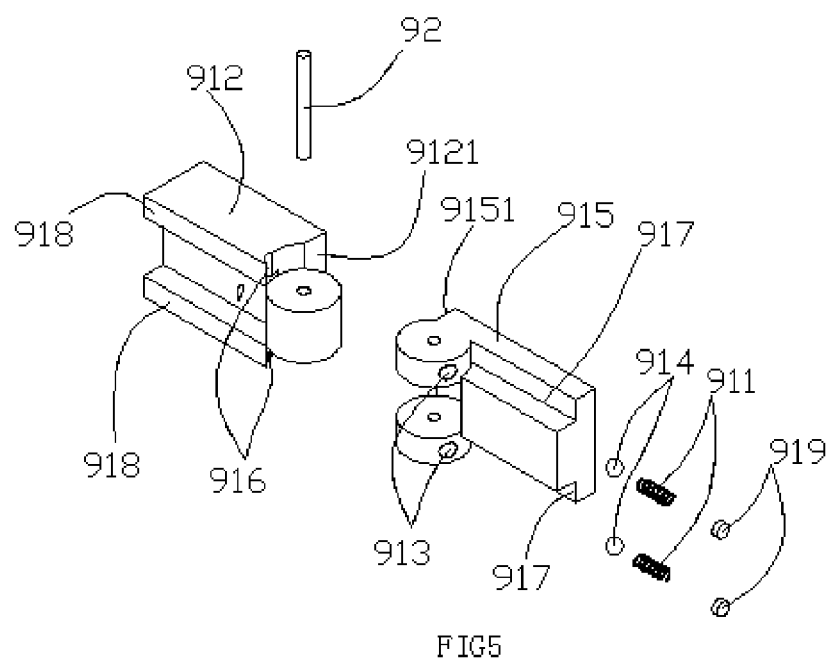
FIG. 5 is a schematic diagram of FIG. 4 viewed from another angle.

Referring to FIGS. 4 and 5, FIGS. 4 and 5 are enlarged and exploded schematic diagrams of another locking mechanism in the present invention, in which, FIG. 5 is a schematic diagram of FIG. 4 viewed from another angle. In this embodiment, the spring 911 and steel ball 914 in the locking mechanism 91 reside within the accommodating hole 913 of the connected part 915 connected to the second rim 3, a screw plug 919 is provided on the back end of the spring 911 so as to protect the spring 911 and the steel ball 914 from stretching out of the accommodating hole 913, and adjusts the pressure of the spring 911 against the steel ball 914; The concave 916 is provided on the connected part 912 connected to the second rim 1, Likewise, when the first rim 1 and the second rim 3 exhibit linear, the steel ball 914 leans within the concave 916 under the action of the spring 911, (the concave 916 here is vertically groove-shaped, which is more beneficial for the gap mating between the steel ball and the concave 916), achieving the locating of the first rim 1 and the second rim 3 and keeping them exhibiting linear.

Referring to FIGS. 6, 7 and 8, FIGS. 6 to 8 are enlarged and exploded schematic diagrams of further locking mechanism in the present invention, in which, FIG. 7 is a schematic diagram of FIG. 6 viewed from another angle; and FIG. 8 is a schematic diagram of FIG. 6 after being assembled. The spring 911 and the steel ball 914 are made into an integral structure 920, The integral structure 920 can slide corresponding to the connected part 912 of the hinge 9 connected to the first rim via a slideway 922 and a translot 923, a second spring 921 is provided at the back end of the integral structure 920, and a concave 916 is provided on the connected part 915 of the hinge 9 connected to the second rim 3. Obviously, the integral structure 920 can also be designed to reside on the connected part 915 connected to the second rim 3 corresponding to the hinge 9, and the concave 916 being disposed on the connected part 912 of the hinge 9 connected to the first rim can play the same role.

FIG. 9 are enlarged and exploded schematic diagrams of another locking mechanism in the present invention, the structure of the locking mechanism 91 illustrated in FIG. 9 is an extended plane 924 extending from a connected part 912 of the hinge 9 located on one side of the nosepiece 100 to another connected part 915 of the hinge 9, a first magnetic piece 925 (which can be replaced with a metal piece) is provided inside the extended plane 924, and a second magnetic piece 927 opposite to the first magnetic piece 925 is provided on a plane 926 of another connected part 915 corresponding to the extended plane 924, and when the first rim 1 and the second rim 3 exhibit linear, the second magnetic piece 927 and the first magnetic piece 925 or the first metal piece are connected and attracted, achieving the locating of the first rim 1 and the second rim 2. according to experiments, if the first magnetic piece 925 and the second magnetic piece 927 are disposed on the head ends of the connected part 912 and the connected part 915, the magnetic attraction therebetween is less than that caused by connecting the magnetic pieces 925 and 927, because if the attraction point of the magnet is heading jointed by both ends, it is impossible to block the arms of the rims and the legs, and the spectacles are always M-shaped after being unfolded. Assume that there are magnetics being on the top end of two rectangular-shaped rods, which are heading jointed together, and if any one rod is lifted, the other one will fall down; As according to the way of connecting with each other, the attraction between both legs can be achieved only if the magnetization of the magnetic is larger than or equal to 2500 Gausses, for example, in the case that two plane magnetics are fixed near both ends of the two rods, as long as there is a corresponding magnetic force, one rod can be lifted to attract and support the other rod. In the present invention, it is better for the magnetization of the first magnetic piece 925 or the second magnetic piece 927 being larger than or equal to 2500 Gausses.

Figure 10:
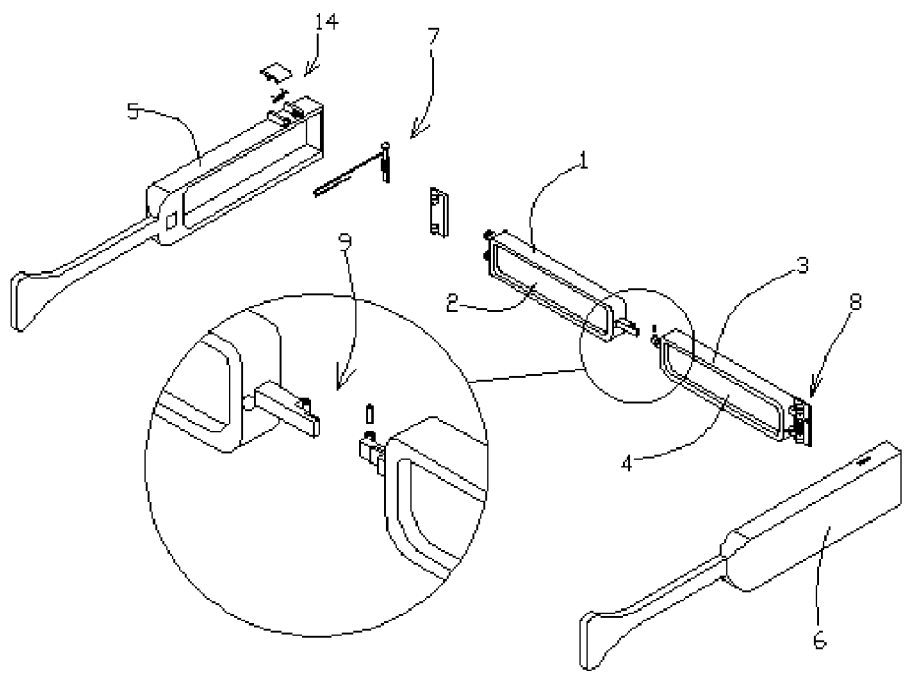
FIG. 10 is a schematic diagram of the status of the locking mechanism of FIG. 9 being used on spectacles.

FIG. 10 is schematic diagram of the status of the locking mechanism of FIG. 9 being used on spectacles.

Figure 11:
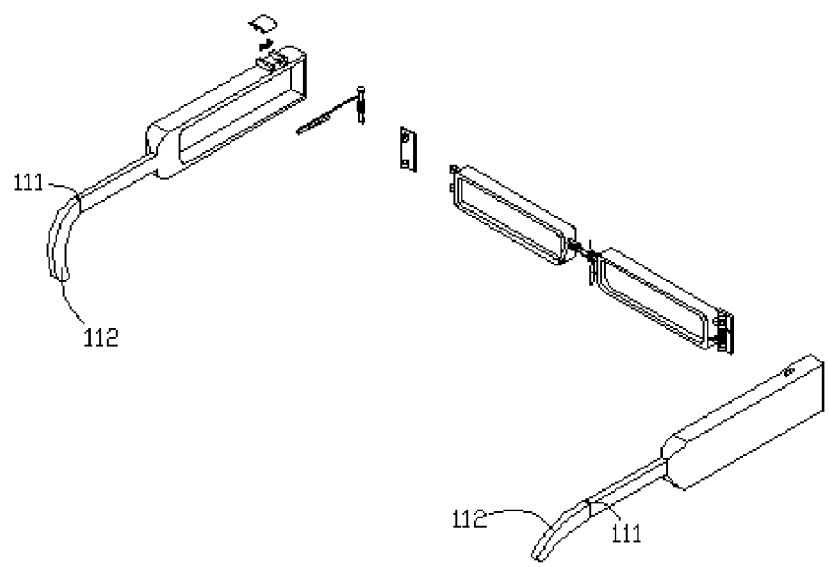
FIG. 11 is a schematic diagram of another embodiment of the present invention after stretching.

Referring to FIG. 11, FIG. 11 is an exploded schematic diagrams of another embodiment in the present invention, The structure of the legs of the spectacles illustrated in FIG. 11 is different, which has a segmental arc 112 bent downward and inward, In order to ensure that the width of the spectacles are not influenced when being folded, it is better to set the segmental arc 112 being elastically connected via a elastic element 111, as such, when the spectacles are completely folded, the segmental arc 112 can be properly unfolded outward; when the spectacles are completely unfolded, the spectacles can return to the wearing state under the action of the elastic force. Similar to the structure of the first elastic element, the elastic connection in the present scheme can also be designed as a structure connected by a spring.

The nodepiece 100 and the segmental arc 112 in FIG. 11 are elastically connected, and this kind of structure is mainly used for prescription glasses and the sun glasses, Because the dimensions of the prescription glasses and the sun glasses are much larger, the nodepiece 100 is not disposed at the central part of the rims, the position of the nodepiece 100 is the same as that of common spectacles, And the back end of the leg (i.e. segmental arc 112) will properly bend inward according to the specification, the segmental arc 112 will result in the spectacles being wider after being folded, Consequently, the nodepiece 100 and the segmental arc 112 in the present embodiment need elastic connection, when the spectacles are completely folded, the nodepiece 100 and the segmental arc 112 can be properly contracted, and the wide of the spectacles will be reduced after being completely folded.

Figure 12:
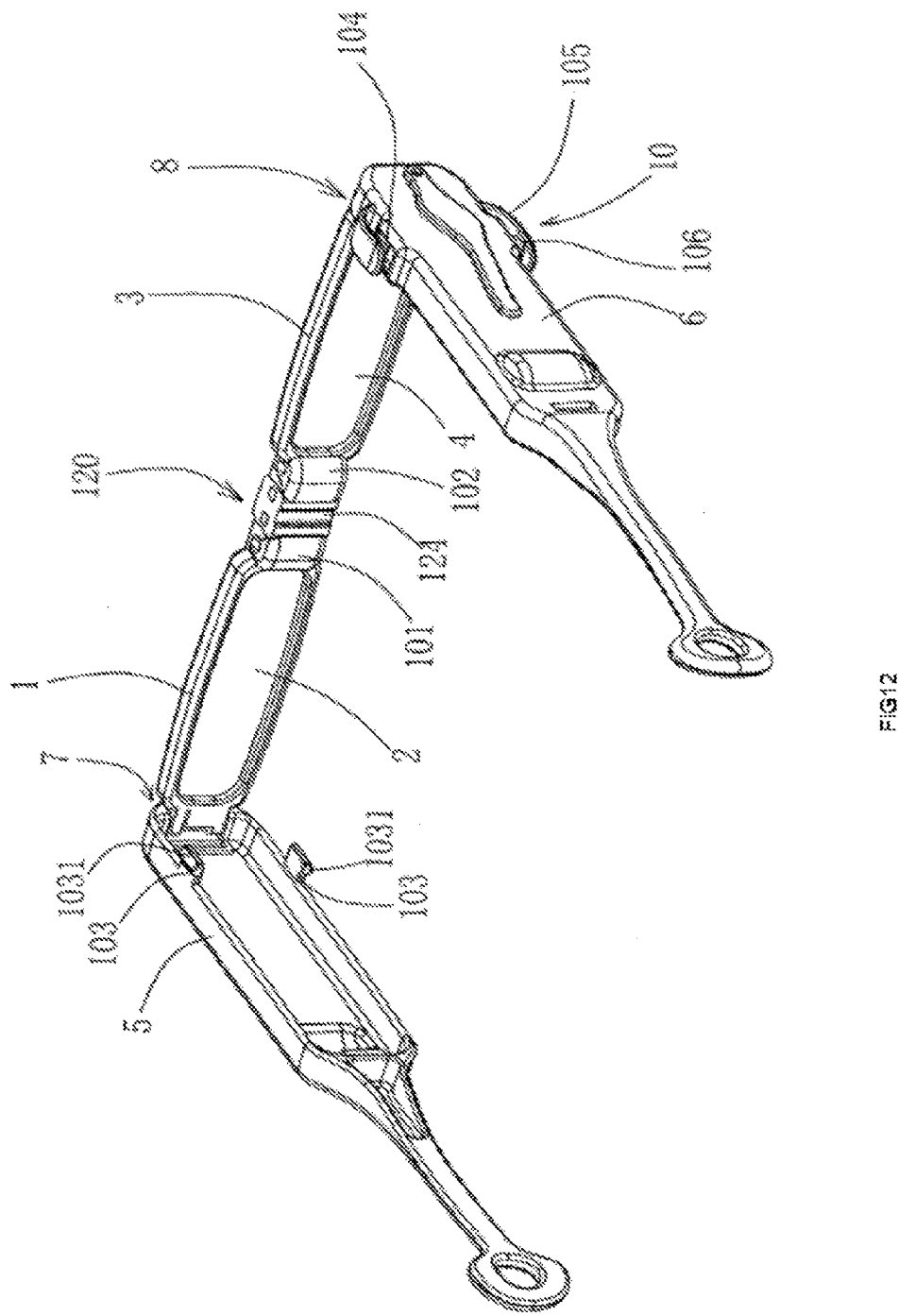
FIG. 12 is a schematic diagram of another embodiment of the present invention after stretching.
Figure 13:
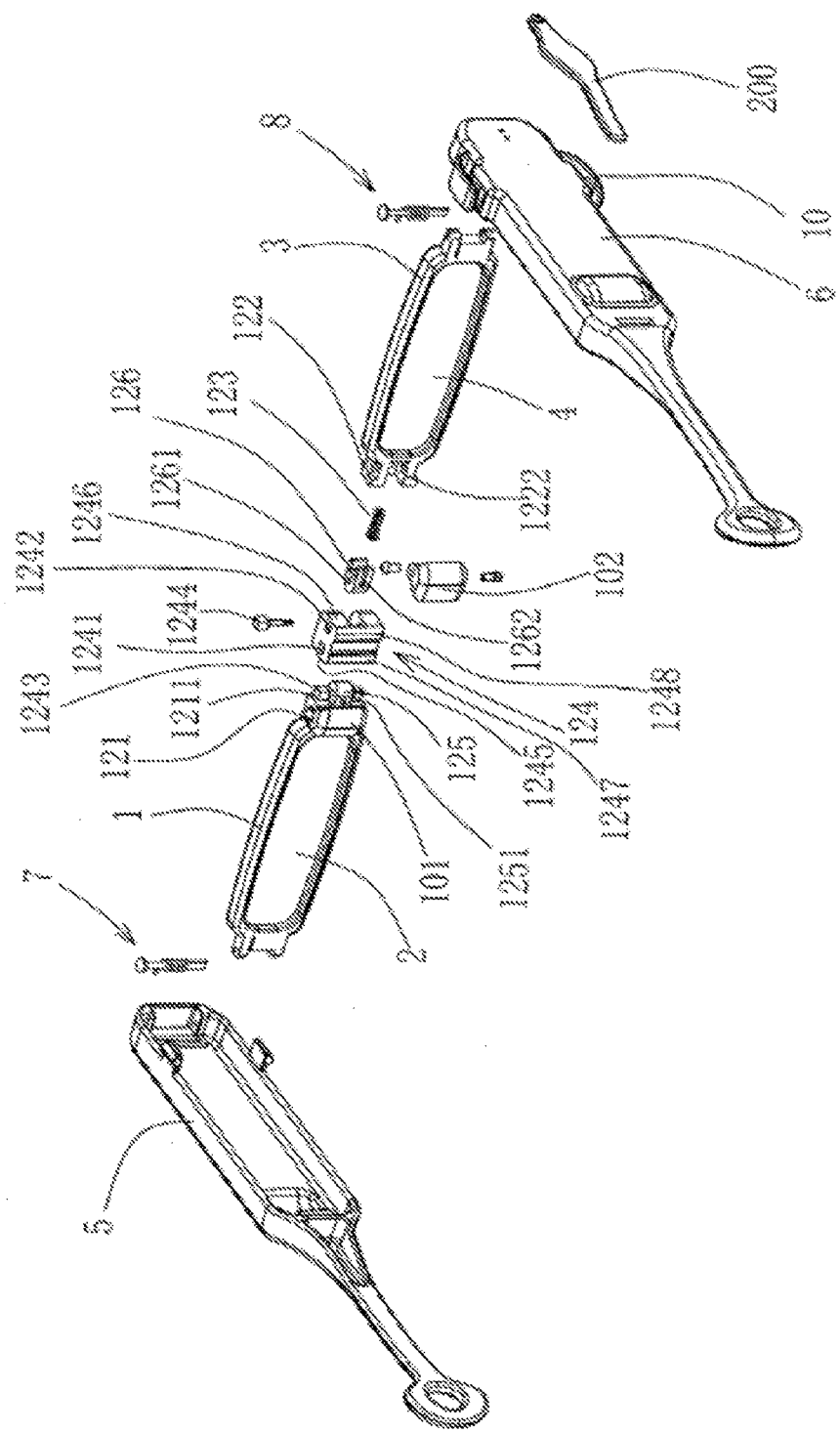
FIG. 13 is an exploded schematic diagram of FIG. 12.
Figure 14:
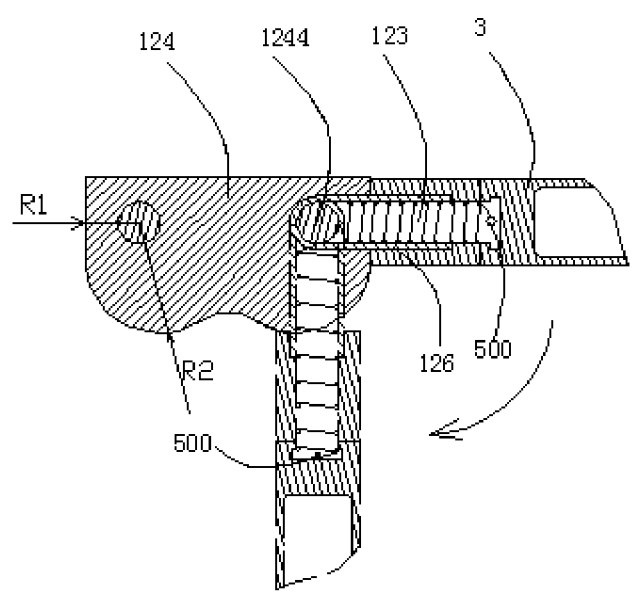
FIG. 14 is a horizental sectional view of middle beam mechanism of FIG. 12.

Referring to FIGS. 12 and 13, FIGS. 12 and 13 illustrate another automatically stretchable folding spectacles, which comprise: a first rim 1, with a first lens 2 being provided within the first rim 1; a second rim 3, with a second lens 4 being provided within the second rim 3, a first leg 5 and a second leg 6, characterized in that the width of the end of the first leg 5 connected to the first rim 1 is larger than or equal to the width of the first lens 2, with its shape being matched with the shape of the first lens 2; and the width of the end of the second leg 6 connected to the second rim 3 is larger than or equal to the width of the second lens 4, with its shape being matched with the shape of the second lens; the first rim 1 and first leg 5 are elastically connected via a first elastic member 7 (of which the structure is the same as that described above); the second rim 3 and second leg 6 are elastically connected via a second elastic member 8 (of which the structure is the same as that described above); a middle beam mechanism 120, which comprises a first middle beam connection member 121, a second middle beam connection member 122, a first extension spring (not shown), a second extension spring 123, and a middle member 124, charaterized in that the first middle beam connection member 121 and the second middle beam connection member 122 are fixed to the inner side of the first rim 1 and the second rim 3 respectively, and have a free end 1211 of the first middle end connection member and a free end 1221 of the second middle end connection member respectively, the top end surfaces of the free end 1211 of the first and the free end 1221 of the second middle beam connection members are flat; a first translot is provided on the first middle beam connection member 121, and a second translot 1222 is provided on the second middle beam connection member 122, with the first extension spring being disposed inside the first translot, the inner end of the first extension spring and the first middle beam connection member 121 being fixedly connected, and the second extension spring 123 being disposed inside the second translot 1222, the inner end of the second extension spring and the second middle beam connection member 122 being fixedly connected; the middle member 124 is located between the first middle beam connection member 121 and the second middle beam connection member 122; a first pivoting connected hole 1241 and a second pivoting connected hole 1242 are provided at the both sides of the middle member 124, which are perpendicular to the normal of the rim, with a first pivoting connected pin 1243 being provided within the first pivoting connected hole 1241, the outer end of the first extension spring being nested around the first pivoting connected pin 1243; a second pivoting connected pin 1244 is provided within the second pivoting connected hole 1242, and the outer end of the second extension spring 123 being nested around the second pivoting connected pin 1244; the both sides of the middle member 124 are flat 1245, 1246, and sides adjacent to the both sides 1245, 1246 of the middle member 124 are contours 1247, 1248; the radius R2 from the first or the second pivoting connected holes 1241, 1242 to the corresponding contours 1247, 1248 thereof is larger than the radius R1 from the first or the second pivoting connected holes 1241, 1242 to the corresponding flat 1245, 1246 thereof; As such, when the spectacles are completely stretched, the tip surface 1211 of the free end 121 of the first middle beam connection member and a corresponding plane 1245 of the middle member 124 exhibit a surface contact, and the first extension spring exhibits a contracted state; the tip surface 1221 of the free end 122 of the second middle beam connection member and a plane 1246 of the middle member 124 exhibit a surface contact, and the second extension spring 123 exhibits a contracted state, namely, a stable state which is convenient in wearing spectacles; when the spectacles are completely folded, the tip surface 1211 of the free end 121 of the first middle beam connection member and a corresponding contour 1247 of the middle member 124 exhibit a line contact, and the first extension spring exhibits an extended state, namely, an unstable state which will return to the stable state at times; the tip surface 1221 of the free end 122 of the second middle beam connection member and a corresponding contour 1248 of the middle member 124 exhibit a line contact, and the second extension spring 123 exhibits an extended state, namely, an unstable state, which will be back to the stable state (referring to FIG. 14, in which the solid line represents the stable state and the dashed line represents the unstable state); and a locking mechanism 10 is provided between the first leg 5 and the second leg 6 laterally and symmetrically, which makes the spectacles capable of keeping a folded state after the spectacles are completely folded. In this embodiment, a first slider 125 is provided within the first translot, a first slider pivoting connected hole is provided on the outer end of the first slider 125, and a first transverse vias 1251 is provided on the first slider 125, with the first extension spring being nested around the first pivoting connected pin 1243 through the first transverse vias 1251; a second slider 126 is provided within the second translot 1222, a second slider pivoting connected hole 1261 is disposed on the outer end of the second slider 126, and a second transverse vias 1262 is provided on the second slider 126, with the second extension spring being nested around the second pivoting connected pin 1244 through the second transverse vias 123. a first nosepiece 101 is provided on the inner side of the first middle beam connection member 121, which covers the first slider 125 and the first extension spring inside the first nosepiece 101; and a second nosepiece 102 is provided on the inner side of the second middle beam connection member 122, which covers the second slider 126 and the second extension spring 123 inside the second nosepiece. A pen-shaped hook 200 is provided on the second leg.

Figure 15:
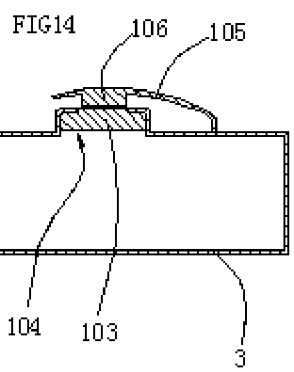
FIG. 15 is a longitudinal sectional view of locking mechanism of FIG. 12.

In addition to the use of the locking mechanism described in FIGS. 1-11, the locking mechanism 10 can be designed as two, one being on the upper portion of the leg, the other being on the lower portion of the leg, and the structure of the locking mechanism 10 on the top of the leg is a buckle 103 extending inward on the upper side of the first leg 5, with the hook ear 1031 of the buckle 103 being upward; a hook hole 104 is disposed in the position of the buckle 103 on the second leg 6 corresponding to the first leg 5; when the spectacles are folded, the buckle 103 is properly hooked inside the hook hole 104, and elastic press pieces 105 are disposed outside the hook holes 104 respectively, bumps 106 are disposed on the elastic press pieces 105 corresponding to the hook holes 104, and when the elastic press pieces 105 are pressed inward the hook holes 104, the buckles 103 are squeezed by the bumps 106, separating the buckles 103 from the hook holes 103 (referring to FIG. 15, likewise thereinafter); Likewise, the structure of the locking mechanism 10 on the lower portion of the leg is the same, which has a locking mechanism being further provided on the first leg 5 symmetrical to the locking mechanism described above, and the structure of this locking mechanism is basically the same as that of the locking mechanism described above, which has buckles 103 extending inward on the upper and lower sides of the second leg 5 respectively, with a hook ear 1031 of the hook 103 being downward; hook holes 104 is provided in the position of the buckles 103 on the second leg 6 corresponding to the first leg 5; when the spectacles are folded, the buckles 103 are properly hooked inside the hook holes 104, and elastic press pieces 105 are disposed outside the hook holes 104 respectively, and bumps 106 are disposed on the elastic press pieces 105 corresponding to the hook holes 104, and when the elastic press pieces 105 are pressed inward the hook holes 104, the buckles 103 are squeezed by the bumps 106, separating the buckles 103 from the hook holes 104.

Obviously, the locking mechanism 10 can also be designed as a structure with the buckles 103 residing on the second leg 6, and the hook holes 104 and elastic pressure pieces 105 residing on the first leg 5, which has the same effect, and the specific structure will no longer be described here.

Referring to FIG. 16, FIG. 16 is a deformed schematic diagram of the middle beam mechanism 120 in the present invention. the middle beam mechanism 120 illustrated in the figure comprises a first middle beam connection member 121, a second middle beam connection member 122, a first contraction spring 127, a second contraction spring 128, and a middle member 124, the first middle beam connection member 121 comprising a first upper connection piece 1212 and a first lower connection piece 1213, which are fixed to the inner side of the first rim in parallel apart from each other, pivoting connected holes 1214 of the first beam connection member are provided on the first upper connection piece 1212 and the first lower connection piece 1213, a first contraction spring 127 is disposed between the first upper connection piece 1212 and the first lower connection piece 1213, and the inner end of the first contraction spring 127 is fixed to the first rim 1, and a first slider 1215 is provided on the outer end of the first contraction spring 127, which can be slidable between the first upper connection piece 1212 and the first lower connection piece 1213; the second middle beam connection member 122 comprising a second upper connection piece 1222 and a second lower connection piece 1223, which are fixed to the inner side of the second rim 3 in parallel apart from each other, pivoting connected holes 1224 of the second beam connection member are provided on the second upper connection piece 1222 and the second lower connection piece 1223, a second contraction spring 128 is disposed between the second upper connection piece 1222 and the second lower connection piece 1223, and the inner end of the second contraction spring 128 is fixed to the second rim 3, and a second slider 1225 is provided on the outer side of the second contraction spring 128, which can be slidable between the second upper connection piece 1222 and the second lower connection piece 1223; the middle member 124 is located between the first middle beam connection member 121 and the second middle beam connection member 122; a first pivoting connected hole 1241 and a second pivoting connected hole 1242 are provided at the both sides of the middle member 124, which are perpendicular to the normal of the rim, with a first pivoting connected pin 1243 being provided within the first pivoting connected hole 1241 for pivoting connecting the first middle beam connection member 121 and the middle member 124; a second pivoting connected pin 1244 being provided within the second pivoting connected hole 1242 for pivoting connecting the second middle beam connection member 122 and the middle member 124; the both sides of the middle member are flat 1245, 1246, and sides adjacent to the both sides of the middle member are contours 1247, 1248; the radius of the first or the second pivoting connected holes 1241, 1242 extending to the corresponding contours 1247, 1248 thereof are larger than the radius of the first or the second pivoting connected holes 1241, 1242 extending to the corresponding flat 1245, 1246 thereof; when the spectacles are completely stretched, the plane 1245 on one side of the first slider piece 1215 and the middle member 124 exhibit a surface contact, and the first extension spring 127 exhibits an extended state; the plane 1246 on the other side of the second slider piece 1216 and the middle member 124 exhibit a surface contact, and the second extension spring 128 exhibits an extended state, namely, a stable state; when the spectacles are completely folded, the contour 1247 on one side of the first slider piece 1215 and the middle member 124 exhibit a line contact, and the first extension spring 127 exhibits an extended state; the contour 1248 on the other side of the second slider piece 1225 and the middle member 124 exhibit a line contact, and the second extension spring 128 exhibits an extended state, namely, an unstable state; the structure of the locking mechanism 10 is the same as those described above (likewise hereinafter).

Referring to FIG. 17, FIG. 17 is another deformed schematic diagram of the middle beam mechanism 120 of the present invention. the structure of the middle beam mechanism 120 is essentially the same as that shown in FIG. 16, and the difference is that a first segment (not shown) is provided on one side of the first slider 1215 near the middle member 124, and a first concave 150 is provided in the position of the middle member 124 corresponding to the first segment; a second segment 12251 is provided on one side of the second slider 1225 near the middle member 124, and a second concave 160 is provided in the position of the middle member 124 corresponding to the second segment 12251; When the spectacles are completely unfolded, the first segment leans within the first concave 150, and the second segment 12251 leans within the second concave 160, which are in a stable state or an unstable state as described above, and it is unnecessary to go into details.

Referring to FIG. 18, FIG. 18 is a third deformed schematic diagram of the middle beam mechanism 120 of the present invention. The middle beam mechanism comprises a first middle beam connection member 121, a second middle beam connection member 122, a transverse contraction spring 129, and a middle member 124, the first middle beam connection member 121 and the second middle beam connection member 122 are fixed to the inner side of the first rim 1 and the second rim 3 respectively, and have a free end 1214 of the first middle beam connection member and a free end 1224 of the second middle beam connection member respectively; the top end surfaces of the free end 1214 of the first middle beam connection member and the free end 1224 of the second middle beam connection member are flat sides adjacent to the top end surfaces are contours 170, 180; a first pivoting connected hole 1241 is provided on the free end 1214 of the first middle beam connection member, which is perpendicular to the normal of the rim, and the radius of the first pivoting connected hole 1241 of the first middle beam connection member extending to the corresponding contour 170 thereof is larger than the first pivoting connected hole of the first middle beam connection member extending to the corresponding plane thereof; a second pivoting connected hole 1242 is provided on the free end 1221 of the second middle beam connection member, which is perpendicular to the normal of the rim, and the radius of the second pivoting connected hole 1242 of the second middle beam connection member extending to the corresponding contour 180 thereof is larger than the second pivoting connected hole of the second middle beam connection member extending to the corresponding plane thereof; the middle member 124 is located between the first middle beam connection member 121 and the second middle beam connection member 122; a first translot is provided on the middle member 124, a transverse contraction spring 129 is provided on the translot, and a first slider 1215 and a second slider 1225 are provided at the both sides of the transverse contraction spring 129, a first pivoting connected hole 1241 and a second pivoting connected hole 1242 are provided at the both sides of the middle member 124, which are perpendicular to the normal of the rim, with a first pivoting connected pin 1243 being provided within the first pivoting connected hole 1241 for pivoting connecting the middle member 124 and the first middle beam connection member 121; a second pivoting connected pin 1244 being provided within the second pivoting connected hole 1242 for pivoting connecting the middle member 124 and the second middle beam connection member 122; when the spectacles are completely stretched, the plane of the free end 1214 of the first middle beam connection member and the first slider 1215 exhibit a surface contact, the plane of the free end 1224 of the second middle beam connection member and the second slider 1225 exhibit a surface contact, and the transverse contraction spring 129 exhibits an extended state; when the spectacles are completely folded, the contour 170 of the free end 1214 of the first middle beam connection member and the first slider 1215 exhibit a line contact, the contour 180 of the free end 1224 of the second middle beam connection member and the second slider 1225 exhibit a line contact, and the transverse contraction spring 129 exhibits a contracted state.

Referring to FIG. 19, FIG. 19 is a fourth deformed schematic diagram of the middle beam mechanism 120 of the present invention. Compared to the example illustrated in FIG. 18, the structure is essentially the same, and the difference is that the first segment 12151 is provided outside the first slider 1215, and a first concave 150 is provided in the position of the first middle beam connection member 121 corresponding to the first segment 12151; the second segment (not shown) is provided outside the second slider 1225, and a second concave 160 is provided in the position of the second middle beam connection member 122 corresponding to the second segment; when the spectacles are completely unfolded, the first segment 12151 leans within the first concave 150, and the second segment leans within the second concave 160.

In the examples described above, a first leg protective rim 131 concaving inward for accommodating the first lens can be provided on the inner wall of the first leg; and a second leg protective rim (not shown) concaving inward for accommodating the second lens can be provided on the inner wall of the second leg, which can achieving that the up and down lenses of the first lens and the second lens are completely packed up after the spectacles being completely folded, so as to protect the lenses from being worn off. The parts of the legs corresponding to the first lens protective rim and the second lens protective rim can be made of a transparent or semitransparent material.

Figure 21:
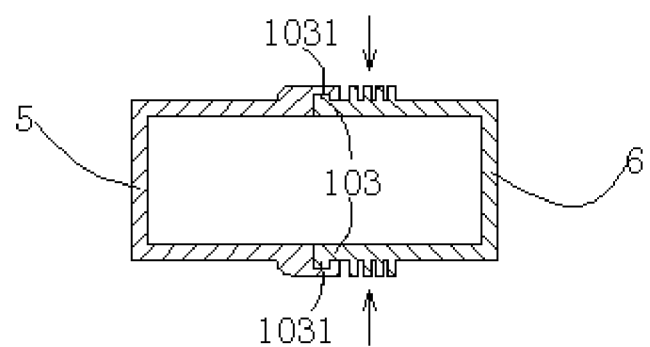
FIG. 21 is a sectional view of the locking mechanism of FIG. 20.

Referring to FIG. 20, FIG. 20 is a third embodiment of the present invention after stretching. The structures shown in the examples of FIG. 20 and FIG. 12 are essentially the same, and the difference is that the structures of the locking mechanism are different, with the structure in FIG. 20 being simpler. This kind of locking mechanism is shown in FIG. 21, of which the structure is buckles extending inward on the upper and lower sides of the second leg 6 respectively (the buckle on the lower side is not shown in the figure), with the hook ear 1031 of the buckles 103 being all outward; hook slots or hook holes 104 are provided in the position of the buckles 103 on the inner wall of the first leg 5 corresponding to the second leg 6; when the spectacles are folded, the buckles 103 are properly hooked within the hook slots or the hook holes 104, when being used, the hook ears 1031 are separated from the hook slots or the hook holes 104, achieving to unfold the spectacles when the side of the second leg 6 is pressed inward according to the arrow direction (when made of plastic, the side has a certain elasticity).

Obviously, the locking mechanism 10 (not shown) can be designed as buckles 103 extending inward on the upper and lower sides of the first leg 5 respectively, with the hook ears 1031 of the buckles 103 being all outward; hook slots or hook holes 104 are provided in the position of the buckles 103 on the inner wall of the second leg 6 corresponding to the first leg 5; when the spectacles are folded, the buckles 103 are properly hooked within the hook slots or the hook holes 104, when the side of the first leg 5 is pressed inward, the hook ears 1031 are separated from the hook slots or the hook holes 104.

Figure 22:
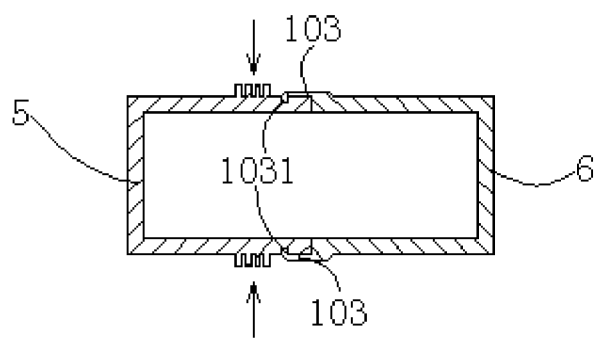
FIG. 22 is a sectional view of a deformed structure of FIG. 21.

Referring to FIG. 22, FIG. 22 is another locking mechanism. the structure of this kind of locking mechanism 10 is buckles 103 extending inward on the upper and lower sides of the second leg 6 respectively, with the hook ears 1031 of the buckles 103 being all inward; hook slots or hook holes 104 are provided in the position of the buckles 103 on the outer wall of the first leg 5 corresponding to the second leg 6; when the spectacles are folded, the buckles 103 are properly hooked within the hook slots or the hook holes 104, when the side of the first leg 5 is pressed inward (when made of plastic, the side has a certain elasticity), the hook ears 1031 are separated from the hook slots or the hook holes 104.

Of course, the structure of the locking mechanism 10 (not shown) can be designed as buckles 103 extending inward on the upper and lower sides of the second leg 6 respectively, with the hook ears 1031 of the buckles 103 being all inward; hook slots or hook holes 104 are provided in the position of the buckles 103 on the outer wall of the first leg 5 corresponding to the second leg 6; when the spectacles are folded, the buckles 103 are properly hooked within the hook slots or the hook holes 104, when the side of the second leg 6 is pressed inward according to the arrow direction, the hook ears 1031 are separated from the hook slots or the hook holes 104.

Figure 23:
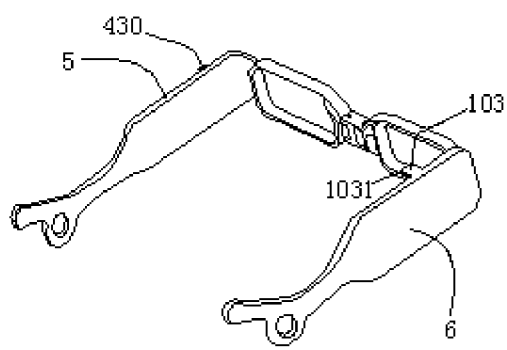
FIG. 23 a schematic diagram of another embodiment of the present invention after stretching.
Figure 24:
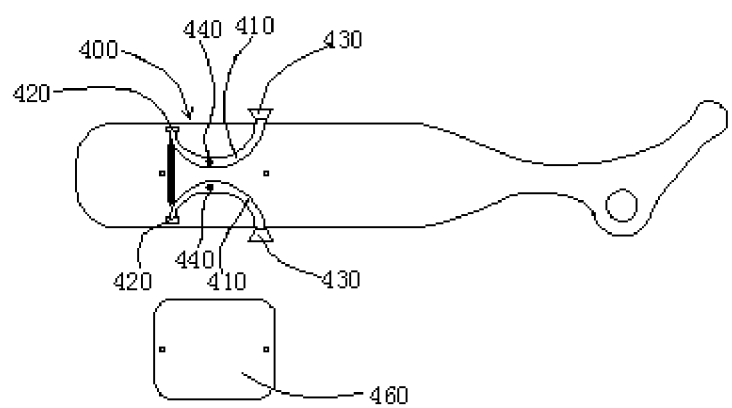
FIG. 24 a schematic diagram of another locking mechanism of FIG. 23.

Referring to FIGS. 23 and 24, FIG. 23 is a schematic diagram of another embodiment of the present invention after stretching. FIG. 24 a schematic diagram of another locking mechanism of FIG. 23. Comparing the examples illustrated in FIGS. 23 *and* 12, the structures are essentially the same, and the difference is that the first leg 5 and the second leg 6 are thin pieces (the thickness had better being 2-4 mm), the structure of the locking mechanism 10 is buckles 103 extending inward on the upper and lower sides of the second leg 6 respectively, with the hook ears 1031 of the buckles 103 being all inward; an open top mechanism 400 is provided on the outer side of the first leg 5 for pushing the buckle 103 away, the open top mechanism 400 comprising two arc levels 410 disposed symmetrically, with one end of the arc level 410 being an open top part 420, and the other end of the arc level 410 being a button 430, and a pivot 440 is provided at the central part of the arc level 410, the arc level 410 and the outer side of the first leg 5 are flexibly connected by the pins or screws at the pivot 440, and when the spectacles are folded, the hook ears 1031 of the buckles 103 are hooked on the outer side of the first leg 5, and correspond to the open top part 420; when the spectacles are required to be opened, it is only needed to press the press button 430 of the arc level 410 manually, resulting in the open top part 420 of the arc level 410 pushing the buckles 103 away, and the spectacles being automatically stretched; in order to make the open top mechanism 400 being automatic reset, an extension spring 450 is provided near one side of the open top part 420 between the both arc levels 410, with the both ends of the extension spring 450 being hooked on the both arc levels 410 respectively, or an extension spring (not shown) is provided near one side of the button 430 between the both arc levels 410, with the both ends of the extension spring being hooked on the both arc levels 410 respectively; in order to protect the top open mechanism 400, a cover board 460 can be provided outside the top open mechanism 400.

Obviously, the structure of the locking mechanism 10 can be designed as a structure that the buckles 103 are disposed on the first leg 5, and the top open mechanism 400 is provided on the second leg 6, which has the same effect as the examples described above.

In the various examples described above, a hook hole 300 convenient for hooking is provided at the back end of the first leg 5 and the second leg 6; for example, when sold in a supermarket, the spectacles can be hooked via this hook hole 300 in order not to occupy a position; when used, the spectacles can be hooked conveniently on the indoor hook as needed.

The above-described embodiments are only the preferred embodiments of the present invention, and are not intended to limit the scope of implementation of the present invention, and therefore, all the equivalents or modifications made according to characteristics and principles described in the claims are covered in the claims of the present invention.

The invention claimed is:

1. An automatically stretchable folding spectacle, comprising: a first rim with a first lens, a second rim with a second lens, a first leg and a second leg; characterized in that the width of the end of the first leg connected to the first rim is larger than or equal to the width of the first lens with the shape of the first rim being matched with the shape of the first lens, and the width of the end of the second leg connected to the second rim is larger than or equal to the width of the second lens with the shape of the second rim being matched with the shape of the second lens; the first rim and the first leg are elastically connected via a first elastic member; the second rim and second leg are elastically connected via a second elastic member; and the spectacle further comprising: a middle beam mechanism comprising a first middle beam connection member, a second middle beam connection member, a first extension spring, a second extension spring and a middle member, wherein the first middle beam connection member and the second middle beam connection member are fixed to the first rim and the second rim respectively, and the first middle beam connection member having a free end and the second middle beam connection member having a free end, the tip surfaces of the free ends are flat; a first translot is provided on the first middle beam connection member, and a second translot is provided on the second middle beam connection member, with the first extension spring being disposed inside the first translot, the inner end of the first extension spring and the first middle beam connection member being flexibly connected, and the second extension spring being disposed inside the second translot, the inner end of the second extension spring and the second middle beam connection member being flexibly connected; the middle member is located between the first middle beam connection member and the second middle beam connection member; a first pivoting connected hole and a second pivoting connected hole are provided at the both sides of the middle member, which are perpendicular to the normal of the rim, with a first pivoting connected pin being provided within the first pivoting connected hole, and the outer end of the first extension spring being nested around the first pivoting connected pin; a second pivoting connected pin is provided within the second pivoting connected hole, with the outer end of the second extension spring being nested around the second pivoting connected pin; the upper and lower surfaces of the middle member are flat, and the front and rear surfaces of the middle member are contour; the radius from the first or the second pivoting connected hole to the front or rear surfaces of the middle member is larger than the radius from the first or the second pivoting connected hole to the upper or lower surfaces of the middle member; and two locking mechanisms are provided between the first leg and the second leg laterally and symmetrically, which makes the spectacle capable of keeping a folded state when the spectacle is completely folded.

2. The automatically stretchable folding spectacles as claimed in claim 1, characterized in that a first slider is provided within the first translot, a first slider pivoting connected hole is provided on the outer end of the first slider, and a first transverse vias is provided on the first slider, with the first extension spring being nested around the first pivoting connected pin through the first transverse vias; a second slider is provided within the second translot, a second slider pivoting connected hole is provided on the outer end of the second slider, and a second transverse vias is provided on the second slider, with the second extension spring being nested around the second pivoting connected pin through the second transverse vias.

3. The automatically stretchable folding spectacle as claimed in claim 2, characterized in that a first nosepiece is provided inside the first middle beam connection member, which covers the first slider and the first extension spring inside the first nosepiece; and a second nosepiece is provided inside the second middle beam connection member, which covers the second slider and the second extension spring inside the second nosepiece.

4. The automatically stretchable folding spectacle as claimed in claim 3, characterized in that the structure of the locking mechanism is a buckle extending inward on the upper and lower sides of the first leg respectively; hook holes are provided in the position of the buckles on the second leg corresponding to the first leg respectively; when the spectacles are folded, the buckles are properly hooked inside the hook holes with elastic press pieces being provided outside the hook holes, and bumps being provided on the elastic press pieces corresponding to the hook holes, and when the elastic press pieces are pressed inward the hook holes, the buckles are squeezed by the bumps and separated from the hook holes; or the structure of the locking mechanism is a buckle extending inward on the upper and lower sides of the second leg respectively; hook holes are provided in the position of the buckles on the first leg corresponding to the second leg; when the spectacle is folded, the buckles are properly hooked inside the hook holes, with elastic press pieces being provided outside the hook holes respectively, and bumps being provided on the elastic press pieces corresponding to the hook holes, and when the elastic press pieces are pressed inward the hook holes, the buckles are squeezed by the bumps, and separated from the hook holes.

5. The automatically stretchable folding spectacle as claimed in claim 3, characterized in that the structure of the locking mechanism is a buckle extending inward on the upper and lower sides of the second leg respectively with hook ears of the buckles being all outward; hook slots or hook holes are provided in the positions of the buckles on inner wall of the first leg corresponding to the second leg respectively; when the spectacle is folded, the buckles are properly hooked inside the hook slots or the hook holes, and when the sides of the second leg are pressed inward directly, the hook ears are separated from the hook slots or the hook holes; or the structure of the locking mechanism is a buckle extending inward on the upper and lower sides of the first leg respectively, with hook ears of the buckles being all outward; hook slots or hook holes are provided in the position of the buckles on the inner wall of the second leg corresponding to the first leg respectively; when the spectacle is folded, the buckles are properly hooked inside the hook slots or the hook holes, and when the sides of the first leg are pressed inward directly, the hook ears are separated from the hook slots or the hook holes.

6. The automatically stretchable folding spectacle as claimed in claim 3, characterized in that the structure of the locking mechanism is a buckle extending inward on the upper and lower sides of the second leg respectively, with hook ears of the buckles being all inward; hook slots or hook holes are provided in the positions of the buckles on the outer wall of the first leg corresponding to the second leg respectively; when the spectacle is folded, the buckles are properly hooked inside the hook slots or the hook holes, and when the sides of the first leg are pressed inward directly, the hook ears are separated from the hook slots or the hook holes; or the structure of the locking mechanism is a buckle extending inward on the upper and lower sides of the second leg respectively, with hook ears of the buckles being all inward; hook slots or hook holes are provided in the positions of the buckles on the outer wall of the first leg corresponding to the second leg; when the spectacle is folded, the buckles are properly hooked inside the hook slots or the hook holes, and when the sides of the second leg are pressed inward directly, the hook ears are separated from the hook slots or the hook holes.

7. The automatically stretchable folding spectacle as claimed in claim 3, characterized in that the structure of the locking mechanism is a buckle extending inward on the upper and lower sides of the second leg respectively, with hook ears of the buckles being all inward; an open top mechanism is provided on the outer side of the first leg for pushing the buckle away, the open top mechanism comprising two arc levels disposed symmetrically with one end of the arc level being an open top part, and the other end of the arc level being a button, and a pivot is provided at the central part of the arc level, with the arc level and the outer side of the first leg being flexibly connected by pins or screws at the pivot, and when the spectacle is folded, the hook ears of the buckles are hooked on the outer side of the first leg, and correspond to the open top part; pressing the button of the arc level manually which results in the open top part of the arc level pushing the buckles away, and the spectacles being automatically stretched; an extension spring is provided near one side of the open top part between the both arc levels, with the both ends of the extension spring being hooked on the both arc levels respectively, or an extension spring is provided near one side of the button between the both arc levels, with the both ends of the extension spring being hooked on the both arc levels respectively; or the structure of the locking mechanism is a buckle extending inward on the upper and lower sides of the first leg respectively, with hook ears of the buckles being all inward; an open top mechanism is provided on the outer side of the second leg for pushing the buckles away, the open top mechanism comprising two arc levels disposed symmetrically, with one end of the arc level being an open top part, and the other end of the arc level being a button, and a pivot is provided at the central part of the arc level, with the arc level and the outer side of the second leg being flexibly connected by the pins or screws at the pivot, and when the spectacles are folded, the hook ears of the buckles are hooked on the outer side of the second leg, and correspond to the open top part; pressing the button of the arc level manually that results in the open top part of the arc level pushing the buckles away, and the spectacles being automatically stretched; an extension spring is provided near one side of the open top part between the both arc levels, with the both ends of the extension spring being hooked on the both arc levels respectively, or an extension spring is provided near one side of the button between the both arc levels, with the both ends of the extension spring being hooked on the both arc levels respectively.

8. An automatically stretchable folding spectacle, comprising a first rim with a first lens, a second rim with a second lens, a first leg and a second leg; characterized in that the width of the end of the first leg connected to the first rim is larger than or equal to the width of the first lens, with the shape of the first rim being matched with the shape of the first lens; and the width of the end of the second leg connected to the second rim is larger than or equal to the width of the second lens, with the shape of the second rim being matched with the shape of the second lens; the first rim and the first leg are elastically connected via a first elastic member; the second rim and second leg are elastically connected via a second elastic member; and the spectacles further comprising; a middle beam mechanism, the middle beam mechanism comprising a first middle beam connection member, a second middle beam connection member, a first contraction spring, a second contraction spring and a middle member, the first middle beam connection member comprising a first upper connection piece and a first lower connection piece, which are fixed to the first rim in parallel apart from each other, a pivoting connected hole of the first middle beam connection member is provided on the first upper connection piece and the first lower connection piece, a first contraction spring is disposed between the first upper connection piece and the first lower connection piece, and the inner end of the contraction spring is fixed to the first rim, with a first slider being provided on the outer end of the contraction spring, which can be slidable between the first upper connection piece and the first lower connection piece; the second middle beam connection member comprising a second upper connection piece and a second lower connection piece, which are fixed to the second rim in parallel apart from each other, a pivoting connected hole of the second beam connection member is provided on the second upper connection piece and the second lower connection piece, a second contraction spring is disposed between the second upper connection piece and the second lower connection piece, the inner end of the contraction spring is fixed to the second rim, and a second slider is provided on the outer end of the contraction spring, which can be slidable between the second upper connection piece and the second lower connection piece; the middle member is located between the first middle beam connection member and the second middle beam connection member; a first pivoting connected hole and a second pivoting connected hole are provided at the both sides of the middle member, which are perpendicular to the normal of the rim, with a first pivoting connected pin being provided within the first pivoting connected hole for pivoting connecting the first middle beam connection member and the middle member, and a second pivoting connected pin being provided within the second pivoting connected hole for pivoting connecting the second middle beam connection member and the middle member; the upper and lower surfaces of the middle member are flat, and the front and rear surfaces of the middle member are contours the radius of the first or the second pivoting connected hole extending to the front or rear surface is larger than the radius of the first or the second pivoting connected hole extending to the upper or lower surface; and two locking mechanism are provided between the first leg and the second leg laterally and symmetrically, which makes the spectacles capable of keeping a folded state after the spectacles are completely folded.

9. The automatically stretchable folding spectacle as claimed in claim 8, characterized in that a first segment is provided on one side of the first slider near the middle member, and a first concave is provided in the position of the middle member corresponding to the first segment; a second segment is provided on one side of the second slider near the middle member, and a second concave is provided in the position of the middle member corresponding to the second segment; when the spectacles are completely stretched, the first segment leans within the first concave, and the second segment leans within the second concave.

10. The automatically stretchable folding spectacle as claimed in claim 9, characterized in that the structure of the locking mechanism is a buckle extending inward on the upper and lower sides of the first leg respectively; hook holes are provided in the positions of the buckles on the second leg corresponding to the first leg; when the spectacle is folded, the buckles are properly hooked inside the hook holes, with elastic press pieces being provided outside the hook holes respectively, and bumps being provided on the elastic press pieces corresponding to the hook holes, and when the elastic press pieces are pressed inward the hook holes, the buckles are squeezed by the bumps and separated from the hook holes; or the structure of the locking mechanism is a buckle extending inward on the upper and lower sides of the second leg respectively; hook holes are provided in the positions of the buckles on the first leg corresponding to the second leg respectively; when the spectacle is folded, the buckles are properly hooked inside the hook holes, with elastic press pieces being provided outside the hook holes respectively, and bumps being provided on the elastic press pieces corresponding to the hook holes, and when the elastic press pieces are pressed inward the hook holes, the buckles are squeezed by the bumps and separated from the hook holes.

11. The automatically stretchable folding spectacle as claimed in claim 9, characterized in that the structure of the locking mechanism is a buckle extending inward on the upper and lower sides of the second leg respectively, with the hook ears of the buckles being all outward; hook slots or hook holes are provided in the positions of the buckles on inner wall of the first leg corresponding to the second leg respectively; when the spectacles are folded, the buckles are properly hooked inside the hook slots or the hook holes, and when the sides of the second leg are pressed inward directly, the hook ears are separated from the hook slots or the hook holes; or the structure of the locking mechanism is a buckle extending inward on the upper and lower sides of the first leg respectively, with hook ears of the buckles being all outward; hook slots or hook holes are provided in the positions of the buckles on the inner wall of the second leg corresponding to the first leg; when the spectacles are folded, the buckles are properly hooked inside the hook slots or the hook holes, and when the sides of the first leg are pressed inward directly, the hook ears are separated from the hook slots or the hook holes.

12. The automatically stretchable folding spectacle as claimed in claim 9, characterized in that the structure of the locking mechanism is a buckle extending inward on the upper and lower sides of the second leg respectively, with the hook ears of the buckles being all inward; hook slots or hook holes are provided in the positions of the buckles on the outer wall of the first leg corresponding to the second leg respectively; when the spectacles are folded, the buckles are properly hooked inside the hook slots or the hook holes, and when the sides of the second leg are pressed inward directly, the hook ears are separated from the hook slots or the hook holes; or the structure of the locking mechanism is a buckle extending inward on the upper and lower sides of the second leg respectively, with hook ears of the buckles being all inward; hook slots or hook holes are provided in the positions of the buckles on the outer wall of the first leg corresponding to the second leg; when the spectacles are folded, the buckles are properly hooked inside the hook slots or the hook holes, and when the sides of the second leg are pressed inward directly, the hook ears are separated from the hook slots or the hook holes.

13. The automatically stretchable folding spectacle as claimed in claim 9, characterized in that the structure of the locking mechanism is a buckle extending inward on the upper and lower sides of the second leg respectively, with the hook ears of the buckles being all inward; an open top mechanism is provided on the outer side of the first leg for pushing the buckle away, the open top mechanism comprising two arc levels disposed symmetrically, with one end of the arc level being an open top part, and the other end of the arc level being a button, and a pivot is provided at the central part of the arc level, with the arc level and the outer side of the first leg being flexibly connected by the pins or screws at the pivot, and when the spectacles are folded, the hook ears of the buckles are hooked on the outer side of the first leg, and correspond to the open top part; pressing the button of the arc level manually which results in the open top part of the arc level pushing the buckles away, and the spectacles being automatically stretched; an extension spring is provided near one side of the open top part between the both arc levels, with the both ends of the extension spring being hooked on the both arc levels respectively, or an extension spring is provided near one side of the button between the both arc levels, with the both ends of the extension spring being hooked on the both arc levels respectively; or the structure of the locking mechanism is a buckle extending inward on the upper and lower sides of the first leg respectively, with hook ears of the buckles being all inward; an open top mechanism is provided on the outer side of the second leg for pushing the buckle away, the open top mechanism comprising two arc levels disposed symmetrically, with one end of the arc level being an open top part, and the other end of the arc level being a button, and a pivot is provided at the central part of the arc level, with the arc level and the outer side of the second leg being flexibly connected by the pins or screws at the pivot, and when the spectacles are folded, the hook ears of the buckles are hooked on the outer side of the second leg, and correspond to the open top part; pressing the of the arc level manually which results in the open top part of the arc level pushing the buckles away, and the spectacles being automatically stretched; an extension spring is provided near one side of the open top part between the both arc levels, with the both ends of the extension spring being hooked on the both arc levels respectively, or an extension spring is provided near one side of the button between the both arc levels, with the both ends of the extension spring being hooked on the both arc levels respectively.

14. An automatically stretchable folding spectacle, comprising a first rim with a first lens, a second rim with a second lens, a first leg and a second leg; characterized in that the width of the end of the first leg connected to the first rim is larger than or equal to the width of the first lens, with the shape of the first rim being matched with the shape of the first lens; and the width of the end of the second leg connected to the second rim is larger than or equal to the width of the second lens, with the shape of second rim being matched with the shape of the second lens; the first rim and the first leg are elastically connected via a first elastic member; the second rim and second leg are elastically connected via a second elastic member; the spectacles further comprising a middle beam mechanism, the middle beam mechanism comprising a first middle beam connection member, a second middle beam connection member, a first contraction spring and a middle member, characterized in that the first middle beam connection member and the second middle beam connection member are fixed to the inner side of the first rim and the second rim respectively, and the first middle end connection member and the second middle end connection member have a free end respectively; the upper surfaces of the free ends of the first and the second middle beam connection members are flat, the front—surfaces of the first and the second middle beam connection members are contours, a first pivoting connected hole is provided on the free end of the first middle beam connection member, which is perpendicular to the rim, and the radius of the first pivoting connected hole of the first middle beam connection member extending to the front surface of the first middle beam connection members is larger than the first pivoting connected hole of the first middle beam connection member extending to the upper surface of the first middle beam connection members; a second pivoting connected hole is provided on the free end of the second middle beam connection member, which is perpendicular to the rim, and the radius of the second pivoting connected hole of the second middle beam connection member extending to the front surface of the first middle beam connection members is larger than the second pivoting connected hole of the second middle beam connection member extending to the upper surface of the first middle beam connection members; the middle member is installed between the first middle beam connection member and the second middle beam connection member; a first translot is provided on the middle member, with a transverse contraction spring being provided on the translot, and a first slider and a second slider being provided at the both sides of the transverse contraction spring, and a first pivoting connected hole and a second pivoting connected hole are provided on the both sides of the middle member, which are perpendicular to the rim, with a first pivoting connected pin being provided within the first pivoting connected hole for pivoting connecting the middle member and the first middle beam connection member and a second pivoting connected pin being provided within the second pivoting connected hole for pivoting connecting the middle member and the second middle beam connection member; and two locking mechanism are provided between the first leg and the second leg laterally and symmetrically, which makes the spectacles capable of keeping a folded state after the spectacles are completely folded.

15. The automatically stretchable folding spectacle as claimed in claim 14, characterized in that a first segment is provided outside the first slider, and a first concave is provided in the position of the first middle beam connection member corresponding to the first segment; a second segment is provided outside the second slider, and a second concave is provided in the position of the second middle beam connection member corresponding to the second segment; when the spectacles are completely stretched, the first segment leans within the first concave, and the second segment leans within the second concave.

16. The automatically stretchable folding spectacle as claimed in claim 15, characterized in that the structure of the locking mechanism is a buckle extending inward on the upper and lower sides of the first leg respectively; hook holes are provided in the positions of the buckles on the second leg corresponding to the first leg; when the spectacles is folded, the buckles are properly hooked inside the hook holes, with elastic press pieces being provided outside the hook holes respectively, and bumps being provided on the elastic press pieces corresponding to the hook holes, and when the elastic press pieces are pressed inward the hook holes, the buckles are squeezed by the bumps and separated from the hook holes; or the structure of the locking mechanism is a buckle extending inward on the upper and lower sides of the second leg respectively; hook holes are provided in the positions of the buckles on the first leg corresponding to the second leg; when the spectacle is folded, the buckles are properly hooked inside the hook holes, with elastic press pieces being provided outside the hook holes respectively, and bumps being provided on the elastic press pieces corresponding to the hook holes, and when the elastic press pieces are pressed inward the hook holes, the buckles are squeezed by the bumps and separated from the hook holes.

17. The automatically stretchable folding spectacle as claimed in claim 15, characterized in that the structure of the locking mechanism is a buckle extending inward on the upper and lower sides of the second leg respectively, with the hook ears of the buckles being all outward; hook slots or hook holes are provided in the positions of the buckles on inner wall of the first leg corresponding to the second leg respectively; when the spectacles is folded, the buckles are properly hooked inside the hook slots or the hook holes, and when the sides of the second leg are pressed inward directly, the hook ears are separated from the hook slots or the hook holes; or the structure of the locking mechanism is a buckle extending inward on the upper and lower sides of the first leg respectively, with hook ears of the buckles being all outward; hook slots or hook holes are provided in the positions of the buckles on the inner wall of the second leg corresponding to the first leg; when the spectacle is folded, the buckles are properly hooked inside the hook slots or the hook holes, and when the sides of the first leg are pressed inward directly, the hook ears are separated from the hook slots or the hook holes.

18. The automatically stretchable folding spectacle as claimed in claim 15, characterized in that the structure of the locking mechanism is a buckle extending inward on the upper and lower sides of the second leg respectively, with the hook ears of the buckles being all inward; hook slots or hook holes are provided in the positions of the buckles on outer wall of the first leg corresponding to the second leg respectively; when the spectacle is folded, the buckles are properly hooked inside the hook slots or the hook holes, and when the sides of the second leg are pressed inward directly, the hook ears are separated from the hook slots or the hook holes; or the structure of the locking mechanism is a buckle extending inward on the upper and lower sides of the second leg respectively, with hook ears of the buckles being all inward; hook slots or hook holes are provided in the positions of the buckles on the outer wall of the first leg corresponding to the second leg; when the spectacles are folded, the buckles are properly hooked inside the hook slots or the hook holes, and when the sides of the second leg are pressed inward directly, the hook ears are separated from the hook slots or the hook holes.

19. The automatically stretchable folding spectacle as claimed in claim 15, characterized in that the structure of the locking mechanism is a buckle extending the buckles being all inward; an open top mechanism is provided on the outer side of the first leg for pushing the buckle away, the open top mechanism comprising two arc levels disposed symmetrically, with one end of the arc level being an open top part, and the other end of the arc level being a button, and a pivot is provided at the central part of the arc level, with the arc level and the outer side of the first leg being flexibly connected by the pins or screws at the pivot, and when the spectacle is folded, the hook ears of the buckles are hooked on the outer side of the first leg, and correspond to the open top part;

pressing the button of the arc level manually which results in the open top part of the arc level pushing the buckles away, and the spectacles being automatically stretched; an extension spring is provided near one side of the open top part between the both arc levels, with the both ends of the extension spring being hooked on the both arc levels respectively, or an extension spring is provided near one side of the button between the both arc levels, with the both ends of the extension spring being hooked on the both arc levels respectively; or the structure of the locking mechanism is a buckle extending inward on the upper and lower sides of the first leg respectively, with hook ears of the buckles being all inward; an open top mechanism is provided on the outer side of the second leg for pushing the buckle away, the open top mechanism comprising two arc levels disposed symmetrically, with one end of the arc level being an open top part, and the other end of the arc level being a button, and a pivot is provided at the central part of the arc level, with the arc level and the outer side of the second leg being flexibly connected by the pins or screws at the pivot, and when the spectacles are folded, the hook ears of the buckles are hooked on the outer side of the second leg, and correspond to the open top part; pressing the button of the arc level manually which, results in the open top part of the arc level pushing the buckles away, and the spectacles being automatically stretched; an extension spring is provided near one side of the open top part between the both arc levels, with the both ends of the extension spring being hooked on the both arc levels respectively, or an extension spring is provided near one side of the button between the both arc levels, with the both ends of the extension spring being hooked on the both arc levels respectively.

* * * * *